US009912986B2

(12) United States Patent
Eyer et al.

(10) Patent No.: US 9,912,986 B2
(45) Date of Patent: Mar. 6, 2018

(54) SYSTEM FOR DISTRIBUTING METADATA EMBEDDED IN VIDEO

(71) Applicant: Sony Corporation, Tokyo (JP)

(72) Inventors: Mark Eyer, Woodinville, WA (US); Paul Hearty, Poway, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/741,168

(22) Filed: Jun. 16, 2015

(65) Prior Publication Data
US 2016/0277793 A1 Sep. 22, 2016

Related U.S. Application Data

(60) Provisional application No. 62/135,246, filed on Mar. 19, 2015.

(51) Int. Cl.
| | | |
|---|---|---|
| *H04N 21/4408* | (2011.01) | |
| *H04N 21/435* | (2011.01) | |
| *H04N 21/235* | (2011.01) | |
| *H04N 21/8358* | (2011.01) | |
| *H04N 21/44* | (2011.01) | |
| *H04N 21/236* | (2011.01) | |
| *G11B 27/034* | (2006.01) | |
| *H04H 60/73* | (2008.01) | |

(52) U.S. Cl.
CPC ..... *H04N 21/44008* (2013.01); *G11B 27/034* (2013.01); *H04H 60/73* (2013.01); *H04N 21/2353* (2013.01); *H04N 21/23614* (2013.01); *H04N 21/435* (2013.01); *H04N 21/8358* (2013.01); *H04H 2201/50* (2013.01)

(58) Field of Classification Search
CPC ............ H04N 19/467; H04N 21/2353; H04N 21/435; H04N 21/44008; H04N 21/8358; H04N 19/46; H04N 16/98
See application file for complete search history.

(56) References Cited

U.S. PATENT DOCUMENTS

| | | | |
|---|---|---|---|
| 7,334,247 B1* | 2/2008 | Finseth | H04N 21/4627 725/21 |
| 8,385,590 B1* | 2/2013 | Moorer | H04N 21/44008 382/100 |
| 8,595,783 B2 | 11/2013 | Dewa | |

(Continued)

OTHER PUBLICATIONS

U.S. Appl. No. 14/295,695, filed Jun. 4, 2014, Eyer.
(Continued)

*Primary Examiner* — Hai V Tran
(74) *Attorney, Agent, or Firm* — Oblon, McClelland, Maier & Neustadt, L.L.P.

(57) ABSTRACT

A method, non-transitory computer-readable storage medium, and reception apparatus for extracting metadata, and an information providing apparatus for providing the metadata. The method for extracting metadata includes processing, by circuitry of the reception apparatus, content that includes the metadata embedded therein. The metadata is embedded as a watermark in a first portion of a video frame of the content. The circuitry determines symbol values of the watermark from the video frame based on luminance values in pixels of the first portion of the video frame of the content to extract the metadata. At least one of the luminance values is less than 16.

17 Claims, 15 Drawing Sheets

(56) References Cited

U.S. PATENT DOCUMENTS

| | | |
|---|---|---|
| 8,705,933 B2 | 4/2014 | Eyer |
| 8,839,338 B2 | 9/2014 | Eyer |
| 8,842,974 B2 | 9/2014 | Kitazato |
| 8,863,171 B2 | 10/2014 | Blanchard et al. |
| 8,872,888 B2 | 10/2014 | Kitazato |
| 8,875,169 B2 | 10/2014 | Yamagishi |
| 8,875,204 B2 | 10/2014 | Kitazato |
| 8,884,800 B1 | 11/2014 | Fay |
| 8,886,009 B2 | 11/2014 | Eyer |
| 8,896,755 B2 | 11/2014 | Kitazato et al. |
| 8,904,417 B2 | 12/2014 | Kitahara et al. |
| 8,908,103 B2 | 12/2014 | Kitazato |
| 8,909,694 B2 | 12/2014 | Yamagishi et al. |
| 8,914,832 B2 | 12/2014 | Yamagishi |
| 8,917,358 B2 | 12/2014 | Eyer |
| 8,918,801 B2 | 12/2014 | Kitazato et al. |
| 8,925,016 B2 | 12/2014 | Eyer |
| 8,930,988 B2 | 1/2015 | Kitazato et al. |
| 8,938,756 B2 | 1/2015 | Kitazato |
| 8,941,779 B2 | 1/2015 | Eyer |
| 8,966,564 B2 | 2/2015 | Kitazato |
| 8,988,612 B2 | 3/2015 | Kitazato |
| 8,989,723 B2 | 3/2015 | Coppinger et al. |
| 9,015,785 B2 | 4/2015 | Yamagishi |
| 9,038,095 B2 | 5/2015 | Fay et al. |
| 9,043,857 B2 | 5/2015 | Dewa |
| 2006/0107195 A1* | 5/2006 | Ramaswamy ......... G06Q 30/02 715/203 |
| 2011/0088075 A1 | 4/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2012/0047531 A1 | 2/2012 | Eyer |
| 2012/0050619 A1 | 3/2012 | Kitazato et al. |
| 2012/0054214 A1 | 3/2012 | Yamagishi et al. |
| 2012/0054235 A1 | 3/2012 | Kitazato et al. |
| 2012/0054268 A1 | 3/2012 | Yamagishi |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081607 A1 | 4/2012 | Kitazato |
| 2012/0082266 A1 | 4/2012 | Kitazato et al. |
| 2012/0084802 A1 | 4/2012 | Kitazato |
| 2012/0163653 A1* | 6/2012 | Anan ................ H04N 19/467 382/100 |
| 2012/0185888 A1 | 7/2012 | Eyer et al. |
| 2012/0253826 A1 | 10/2012 | Kitazato et al. |
| 2012/0315011 A1 | 12/2012 | Messmer et al. |
| 2013/0024894 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0191860 A1 | 7/2013 | Kitazato et al. |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0020042 A1 | 1/2014 | Eyer |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0074855 A1* | 3/2014 | Zhao ................ H04N 21/8455 707/746 |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150040 A1 | 5/2014 | Kitahara et al. |
| 2014/0157304 A1 | 6/2014 | Fay et al. |
| 2014/0186008 A1 | 7/2014 | Eyer |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |
| 2014/0327825 A1 | 11/2014 | Eyer |
| 2014/0341272 A1* | 11/2014 | Miller ................ H04N 5/202 375/240.02 |
| 2014/0348448 A1 | 11/2014 | Eyer |
| 2014/0351877 A1 | 11/2014 | Eyer |
| 2014/0354890 A1 | 12/2014 | Eyer |
| 2015/0007215 A1 | 1/2015 | Fay et al. |
| 2015/0007219 A1 | 1/2015 | Blanchard et al. |
| 2015/0007242 A1 | 1/2015 | Fay |
| 2015/0012588 A1 | 1/2015 | Yamagishi |
| 2015/0012955 A1 | 1/2015 | Kitazato |
| 2015/0020146 A1 | 1/2015 | Eyer |
| 2015/0026730 A1 | 1/2015 | Eyer |
| 2015/0026739 A1 | 1/2015 | Kitazato |
| 2015/0033280 A1 | 1/2015 | Fay |
| 2015/0038100 A1 | 2/2015 | Fay |
| 2015/0046937 A1 | 2/2015 | Kitazato et al. |
| 2015/0046942 A1 | 2/2015 | Eyer |
| 2015/0058410 A1 | 2/2015 | Yamagishi et al. |
| 2015/0058875 A1 | 2/2015 | Kitahara et al. |
| 2015/0058906 A1 | 2/2015 | Kitazato et al. |
| 2015/0058911 A1 | 2/2015 | Kitazato et al. |
| 2015/0062428 A1 | 3/2015 | Eyer |
| 2015/0067713 A1 | 3/2015 | Yamagishi |
| 2015/0074704 A1 | 3/2015 | Kitazato |
| 2015/0082367 A1 | 3/2015 | Kitazato |
| 2015/0100997 A1 | 4/2015 | Kitazato |
| 2015/0358507 A1* | 12/2015 | Eyer ................ H04N 21/4302 348/515 |

OTHER PUBLICATIONS

U.S. Appl. No. 14/566,574, filed Dec. 10, 2014, Fay.
U.S. Appl. No. 14/584,875, filed Dec. 29, 2014, Eyer.
U.S. Appl. No. 14/626,216, filed Feb. 19, 2015, Kitazato.
U.S. Appl. No. 14/659,245, filed Mar. 16, 2015, Yamagishi.
U.S. Appl. No. 14/680,752, filed Apr. 7, 2015, Eyer.
U.S. Appl. No. 14/686,277, filed Apr. 14, 2015, Fay et al.
U.S. Appl. No. 14/735,879, filed Jun. 10, 2015, Kitazato et al,.
International Search Report and Written Opinion dated May 17, 2016 in PCT/US16/20461.
Manoj Kumar, "Robust Digital Video Watermarking using Reversible Data Hiding and Visual Cryptography", Dublin Institute of technology, ARROW@DIT, Network Security and Digital Forensics Group, ISSC 2013, LYIT Letterkenny, Jun. 20-21, 2013, 7 pages.

* cited by examiner

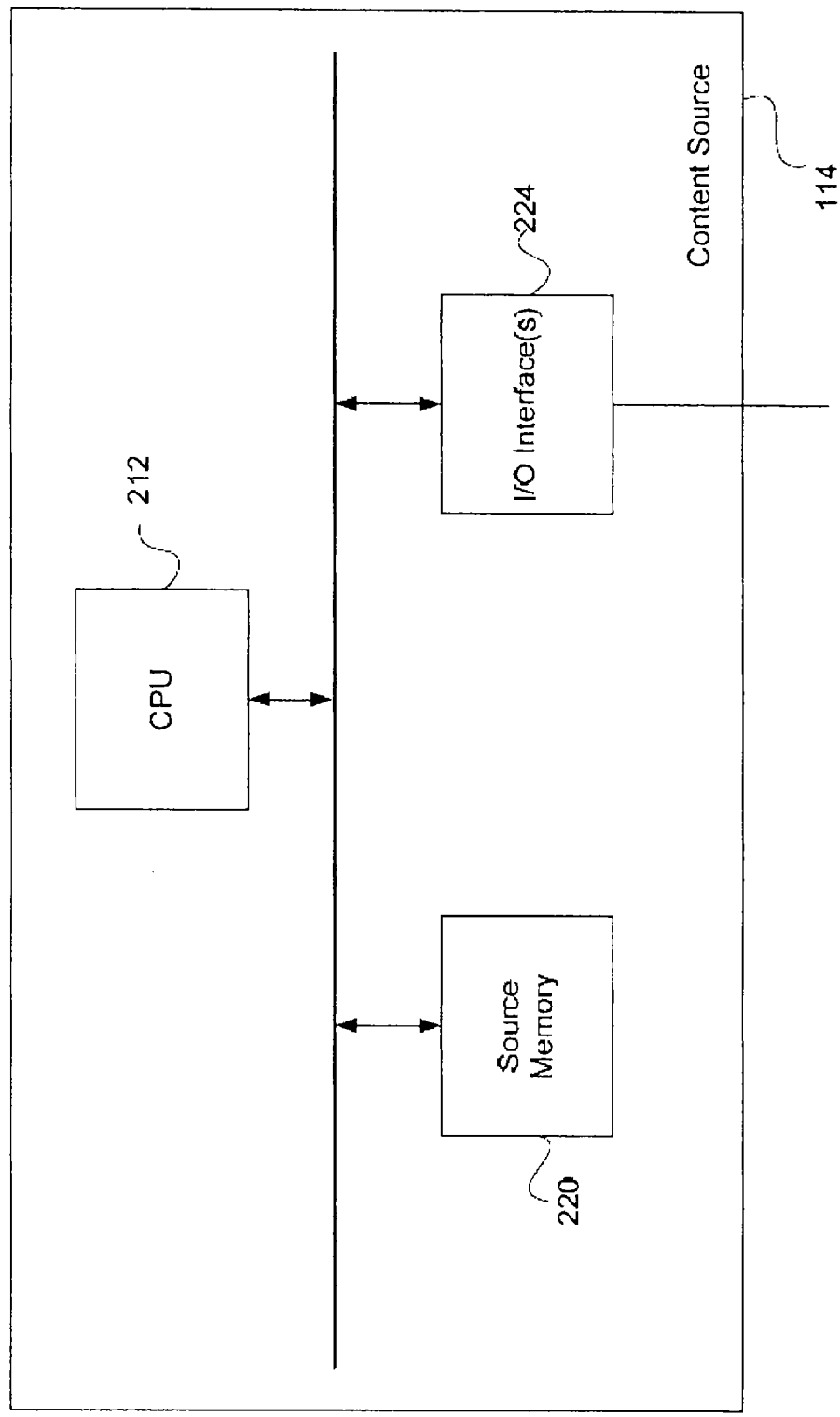

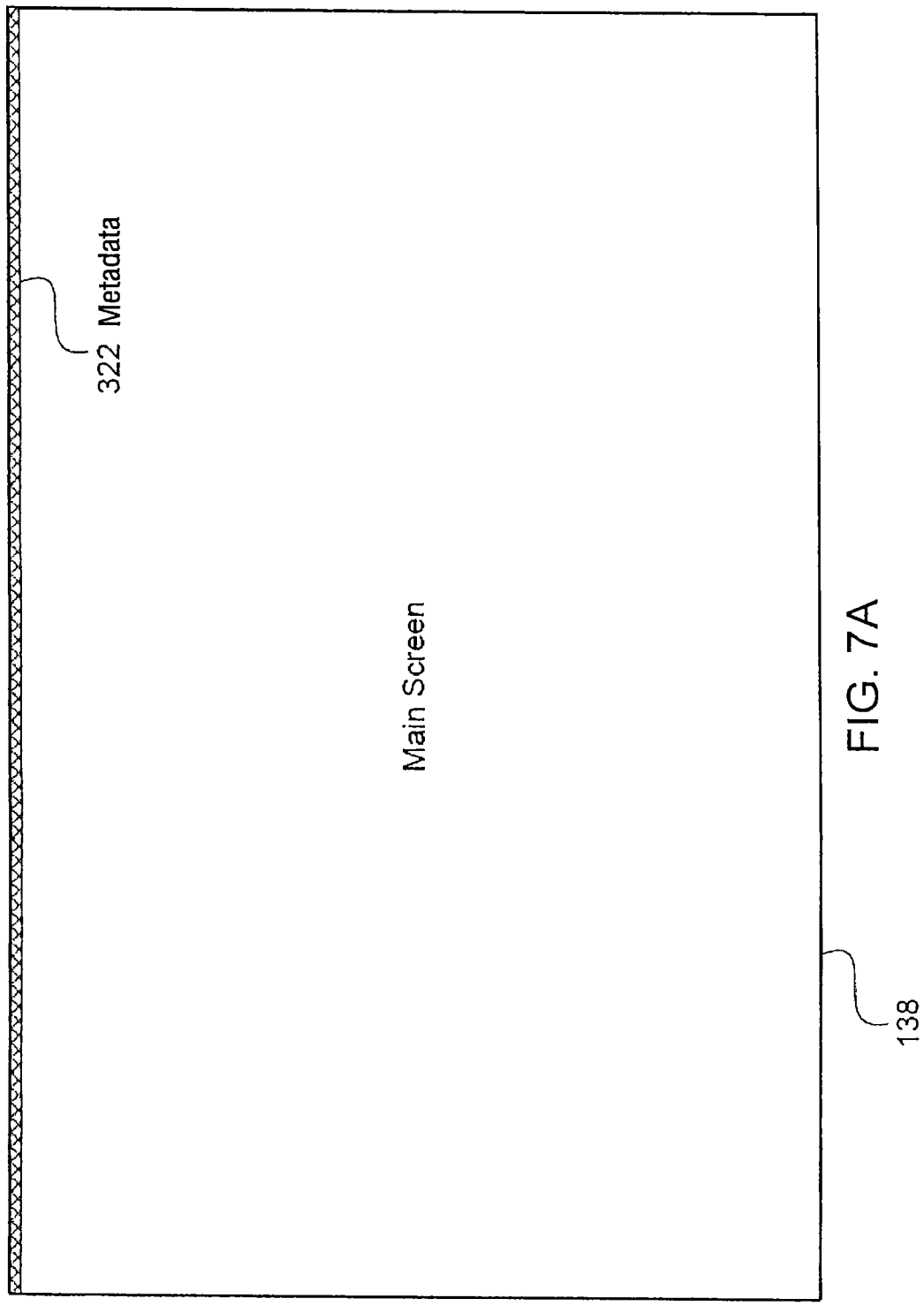

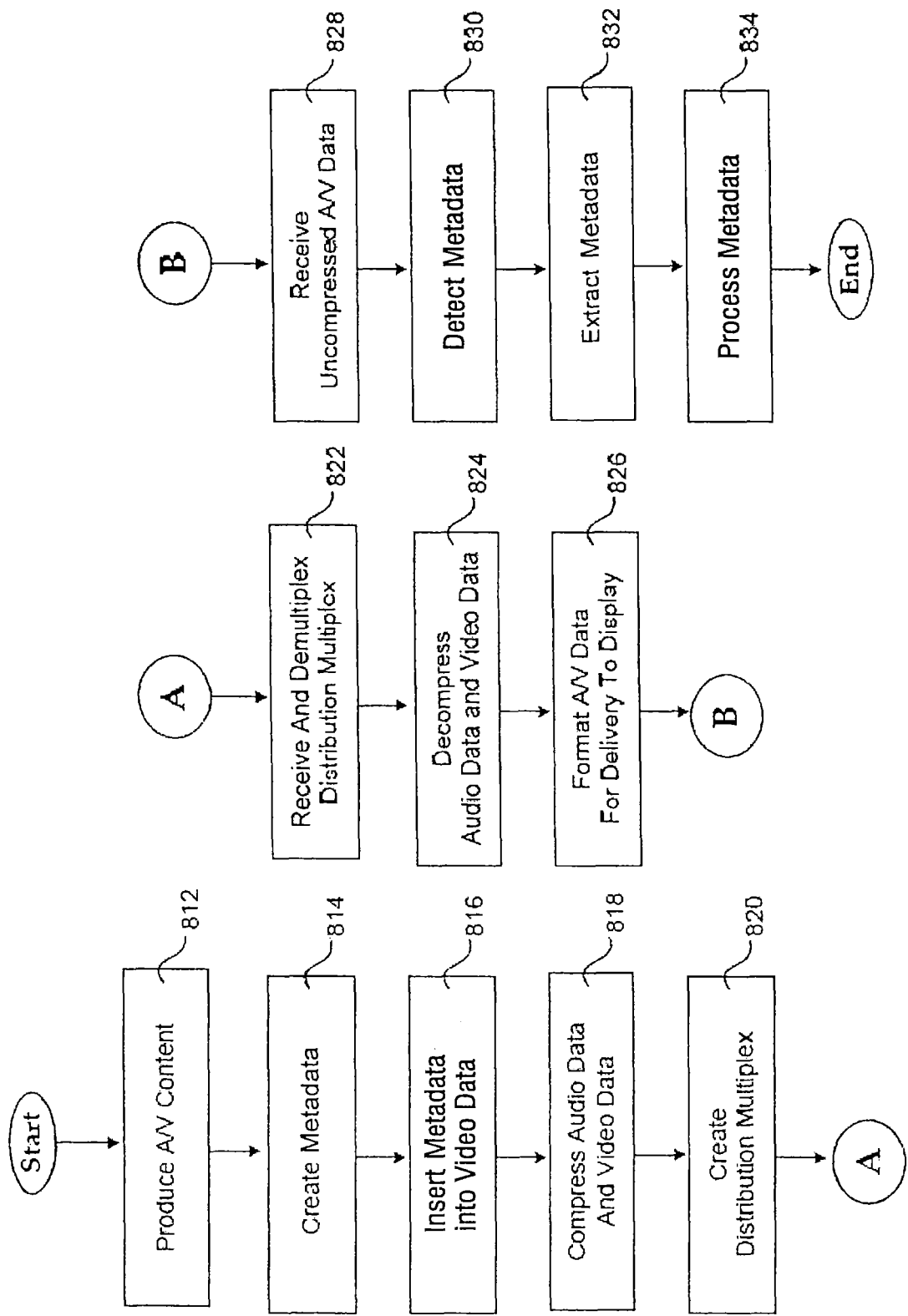

SYSTEM FOR DISTRIBUTING METADATA EMBEDDED IN VIDEO

CROSS-REFERENCE TO RELATED APPLICATIONS

This application is based upon and claims the benefit of priority from U.S. Provisional Application No. 62/135,246, filed on Mar. 19, 2015, the entire contents of which are incorporated herein by reference.

BACKGROUND OF THE INVENTION

Field of the Invention

Embodiments described herein relate generally to a method, non-transitory computer-readable storage medium, and reception apparatus for extracting metadata; and a method, non-transitory computer-readable storage medium, and an information providing apparatus for providing the metadata.

Background

Implementing effective methods for distribution of metadata within digital television systems is a significant consideration for designers and manufacturers of contemporary electronic entertainment systems. However, effectively implementing such systems may create substantial challenges for system designers. For example, enhanced demands for increased system functionality and performance may require more capabilities and require additional hardware and software resources. Impediments to the effective delivery of metadata in advanced systems may result in a corresponding detrimental economic impact due to operational inefficiencies, lost revenue opportunities, and reduced functionality.

Furthermore, enhanced system capability to perform various advanced operations can offer additional benefits to the end user, but may also place increased demands on the control and management of various system components. For example, an enhanced electronic system that effectively supports synchronized television widget functionality may benefit from methods providing flexible carriage of the data stream supporting this functionality.

Due to growing demands on system resources and substantially increasing data magnitudes, it is apparent that developing new techniques for implementing and utilizing data distribution through digital television systems is a matter of concern for related electronic technologies. Therefore, for all the foregoing reasons, developing effective systems for implementing and utilizing data distribution through digital television systems remains a significant consideration for designers, manufacturers, and users of contemporary electronic entertainment systems.

SUMMARY OF THE INVENTION

Embodiments of the present disclosure relate to embedding metadata in a portion of video data.

According to an embodiment of the present disclosure, there is provided a method of a reception apparatus for extracting metadata. The method includes processing, by circuitry of the reception apparatus, content that includes the metadata embedded therein, the metadata being embedded as a watermark in a first portion of a video frame of the content. Symbol values of the watermark embedded in the video frame are determined by the circuitry based on luminance values in pixels of the first portion of the video frame of the content to extract the metadata. Further, at least one of the luminance values is less than 16.

Further, according to an embodiment of the present disclosure, there is provided a non-transitory computer readable medium storing a program, which when executed by a computer causes the computer to perform a method of a reception apparatus for extracting metadata. The method includes processing content that includes the metadata embedded therein, the metadata being embedded as a watermark in a first portion of a video frame of the content. Symbol values of the watermark embedded in the video frame are determined based on luminance values in pixels of the first portion of the video frame of the content to extract the metadata. Further, at least one of the luminance values is less than 16.

Further, according to an embodiment of the present disclosure, there is provided a reception apparatus including circuitry configured to process content that includes the metadata embedded therein, the metadata being embedded as a watermark in a first portion of a video frame of the content. The circuitry determines symbol values of the watermark embedded in the video frame based on luminance values in pixels of the first portion of the video frame of the content to extract the metadata. Further, at least one of the luminance values is less than 16.

Further, according to an embodiment of the present disclosure, there is provided an information providing apparatus including circuitry configured to receive or retrieve content to be provided to a reception apparatus. The circuitry embeds metadata in a video frame of the content, the metadata being embedded as a watermark in a first portion of a video frame of the content. Further, the circuitry provides the content to the reception apparatus. Symbol values of the watermark are represented by luminance values in pixels of the first portion of the video frame of the content. Further, at least one of the luminance values is less than 16.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 is a block diagram for one embodiment of the content source of FIG. 1A, in accordance with the present disclosure;

FIGS. 7A and 7B are diagrams of metadata embedded in video data, in accordance with two different embodiments of the present disclosure; and FIGS. 8A-8E are a flowchart of method steps for distributing and/or extracting metadata, in accordance with one embodiment of the present disclosure.

DETAILED DESCRIPTION

Figure 1A:
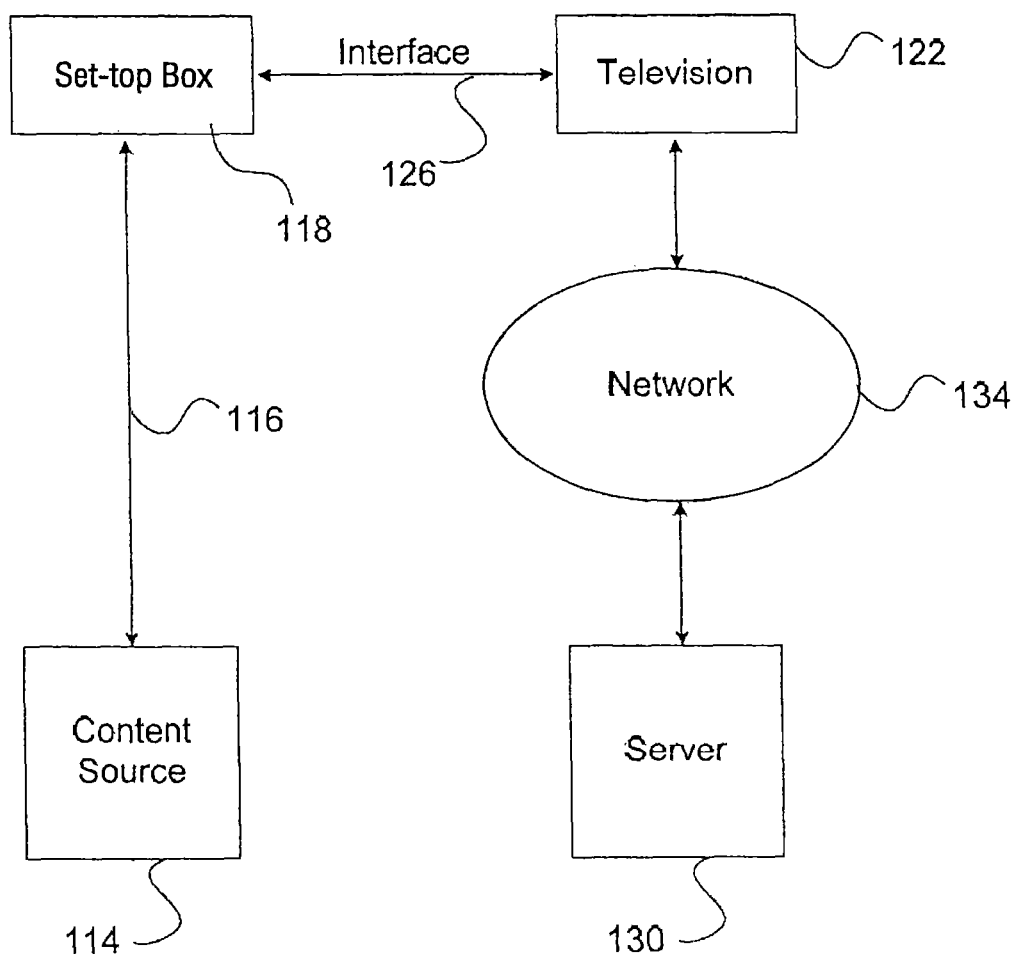
FIG. 1A is a block diagram of an electronic system, in accordance with one embodiment of the present disclosure.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the present disclosure relate to embedding metadata in video data. The metadata is embedded as a watermark in the video data. Although the present disclosure is primarily described using a watermark embedded in line 1 of a video frame, the watermark may be embedded in other lines or other predetermined portions of the frame.

The present disclosure is described herein as a system and method for distributing metadata embedded in video data, and includes a content source that embeds the metadata into the video data. The content source then encodes the video data together with the metadata to create a distribution multiplex including compressed video data. A decoder receives and decompresses the distribution multiplex to reproduce the video data with the metadata embedded. A television or other viewing device then detects and extracts the metadata from the video data.

The television or other device processes the metadata data to receive information that, for example, allows the viewing device to identify a channel currently being watched and recognize a channel change; to identify the content being viewed, including short content such as interstitials; to discover a location for accessing additional information about the content (e.g., a URL of a remote server); to identify the temporal location within the content being rendered, ideally to a level of per sample or access unit accuracy; and/or to receive a time-sensitive event trigger in real time.

Referring now to FIG. 1A, a block diagram of an electronic system 110 is shown, in accordance with one embodiment of the present disclosure. In the FIG. 1A embodiment, the electronic system 110 may include, but is not limited to, a content source 114, a set-top box 118, an interface 126, a television 122, an optional network 134, and an optional server 130. In alternate embodiments, the electronic system 110 may be implemented using components and configurations in addition to, or instead of, certain of those components and configurations discussed in conjunction with the FIG. 1A embodiment. For example, any number of televisions 122 may be similarly deployed in the electronic system 110. In addition, the network 134 and the server 130 may not be included in all embodiments of the present disclosure.

In the FIG. 1A embodiment, the content source 114 may be implemented as one or more electronic devices or other entities that prepare and distribute content data, including video data and audio data, for reproduction by the television 122. In the FIG. 1A embodiment, the content source 114 may be implemented as any appropriate entity. For example, content source 114 may include a television broadcasting facility, a cable television distribution facility, a satellite television distribution facility, or an Internet server entity. Additional details regarding the implementation and utilization of the content source 114 are further discussed below in conjunction with FIGS. 2-4.

In the FIG. 1A embodiment, the content source 114 creates an encoded distribution multiplex containing the content data in a compressed format, and then distributes the distribution multiplex through a distribution network via path 116 (e.g., a terrestrial television broadcast channel, cable TV network, satellite broadcast channel, etc.) to a decoder device. In the FIG. 1A embodiment, the decoder device is implemented in a set-top box 118. However, in other embodiments, the decoder device may be implemented as any appropriate entity, either external to, or integral with, the television 122. In certain embodiments, additional devices or entities may be interposed between the content source 114 and the set-top box 118. Examples of such entities may include, but are not limited to, a broadcast network affiliate and a service provider (such as a satellite or cable head-end).

In the FIG. 1A embodiment, the set-top box 118 decodes the encoded distribution multiplex to generate uncompressed A/V data (video data and audio data) that is provided to the television 122 via an appropriate interface 126. In the FIG. 1A embodiment, the interface 126 may be implemented in any effective manner. For example, the interface 126 may be implemented according to a High Definition Multimedia Interface (HDMI) standard that provides a high-speed parallel interface to deliver uncompressed video data and audio data, and/or control/timing signals to the television 122. The television 122 may then responsively receive and reproduce the video data and audio data for utilization by a system user. Additional details regarding the implementation and utilization of television 122 are further discussed below in conjunction with FIGS. 5-6.

In the FIG. 1A embodiment, the electronic system 110 supports additional services related to the main content data. The additional services include Declarative Objects (DOs), also referred to as applications, for providing the user's interactive experience. DOs and other additional services are described in ATSC Candidate Standard: Interactive Services Standard A/105:2014 (S13-2-389r7, Rev. 7-24 Apr. 2014), which is incorporated herein by reference in its entirety.

DOs may include discrete areas that are displayed on the television 122 to provide any desired type of information. Additional details regarding the DOs are further provided below in conjunction with FIG. 1B. In the FIG. 1A embodiment, the electronic system 110 advantageously supports synchronized DOs that provide information that is related (synchronized) to the main content data that is currently being displayed on television 122. In order to successfully support synchronized DOs (e.g., triggered declarative objects (TDOs)), the electronic system 110 also provides certain types of metadata (e.g., triggers, TDO Parameters Table (TPT), etc.) to the television 122.

A TDO is a downloadable software object created by a content provider, content creator, or other service provider types, which includes declarative content (e.g., text, graphics, descriptive markup, scripts, and/or audio) whose function is tied in some way to the content it accompanies. An embodiment of the TDO is described in the ATSC Candidate Standard A/105:2014. However, the TDO is not limited to the structure described in the ATSC Candidate Standard since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player (e.g., the DO Engine) supports a scripting language that is an object-oriented programming language (e.g., JavaScript). The TDOs, in examples shown herein, are received from a content or service provider, via for example the server 130, in advance of the time they are executed so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

In one embodiment, the trigger can be considered to include three parts, two being required and the third being optional: <domain name part>/<directory path>[?<parameters>]. The <domain name part> references a registered Internet domain name. The <directory path> is an arbitrary character string identifying a directory path under the control and management of the entity who owns rights to the identified domain name. In the TDO model, the combination of <domain name part> and <directory path> shall uniquely identify a TPT that can be processed by a receiver to add interactivity to the associated content. In the direct execution model, the combination of <domain name part> and <directory path> shall uniquely identify the DO to be launched. The <parameters> portion of the trigger is optional. When present, it can convey one or more parameters associated with the trigger. An exemplary trigger is xbc.tv/e12.

The trigger is a data object, which is optionally bound to a particular item or segment of content (e.g., a television program) that references a specific TDO instance, by the use of a file name or identifier for an object that has already been or is to be downloaded. Certain TDOs will only make sense in conjunction with certain content. An example is a TDO that collects viewer response data, such as voting on a game show or contest.

The TPT contains metadata about a TDO of a content segment and defines one or more events for the TDO. The events of the TDO may be triggered based on a current timing of the content being reproduced or by a reference to one or more events contained in one or more triggers. For example, one or more parameters associated with a trigger may be provided to the television 122 in the TPT.

While a trigger indicates that the time is right for the TDO to perform a certain action, a series of timed actions can be played out without a trigger, for example by using the TPT. The TPT, or a separate Activation Messages Table (AMT), optionally provides timing information for various interactive events relative to "media time." Each item of interactive content has a timeline for its play out; an instant of time on this timeline is called media time. For example, a 30-minute program may have an interactive event at media time ten minutes, 41 seconds, and 2 frames from the beginning of the program, or media time 10:41+02. The TPT can include an entry indicating the details of the event that is to occur at time 10:41+02. Once the reception apparatus 20 determines the current timing relative to the start of the program, it can use the TPT, and optionally the AMT, to play out all subsequent events.

The television 122 may obtain the metadata from any appropriate source including, but not limited to, the content source 114 or the server 130. In the FIG. 1A embodiment, the television 122 may communicate with the server 130 via any effective network 134 including, but not limited to, the Internet. Additional details regarding the creation, distribution, and utilization of metadata are further discussed below in conjunction with FIGS. 4, 7, and 8.

The present disclosure generally involves embedding metadata in a video signal so that the metadata may be quickly and easily recovered by receiving devices like the television 122. In certain embodiments, the content source 114 inserts metadata within a distributed video signal so that the metadata travels through the distribution chain, comes into a consumer's home via a compressed interface (from a cable, satellite, or IPTV service provider), is de-compressed in the set-top box 118, and then travels to the television 122 in an uncompressed format, where the television 122 retrieves and utilizes the embedded metadata to support the additional services, such as synchronized DOs. The foregoing techniques can circumvent service providers or other entities from intentionally or unintentionally blocking the consumer's access to the metadata that is required to provide enhanced functionality to television 122.

Certain cable, satellite, and IPTV entities typically provide system users with set-top boxes that are interfaced to digital televisions via HDMI uncompressed video interfaces or other appropriate means. If a content owner wishes to include metadata (such as a URL, applet, etc.) with the content data, and if that metadata travels with the content data as a separate digital stream (or as metadata within the compressed bit stream), the metadata will be blocked at the set-top box 118.

Typically, the set-top box 114 does not pass ancillary data streams in the distribution multiplex, because the set-top box decodes only audio data and video data, and then passes only the uncompressed video data and audio data across to the television. Ancillary data streams are therefore unavailable to the television. Further, if service providers (those offering the set-top boxes) perceive that providing access to any ancillary data is competitive to their business model, they may not be inclined to help the consumer electronics industry by providing such access.

By embedding metadata within the video data, the metadata survives compression/decompression and is able to arrive intact at the television 122. Further, in embodiments of the present disclosure, the metadata is embedded as a watermark in a manner that addresses its visibility. In other words, the present disclosure advantageously embeds metadata within the video signal (encoded within the video image, not as a separate ancillary data stream) in a manner that decreases visibility to a viewer. The present disclosure therefore not only successfully overcomes the architectural roadblock discussed above, but also limits visibility of the embedded watermark to avoid possible distraction to the viewer. The implementation and utilization of the electronic system 110 illustrated in FIG. 1A is further discussed below in conjunction with FIGS. 1B-8.

Figure 1B:
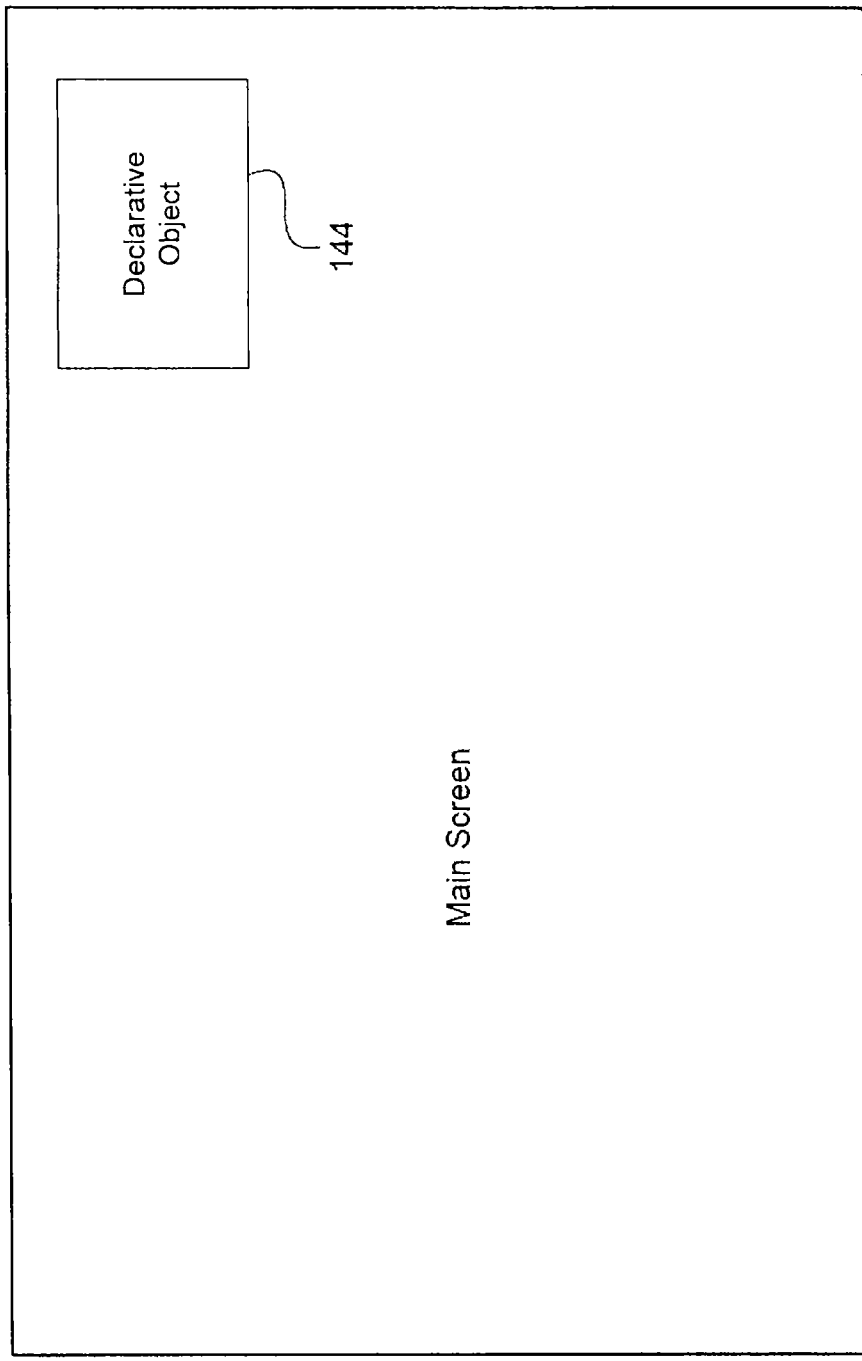
FIG. 1B is a diagram of a display from the television of FIG. 1A, in accordance with one embodiment of the present disclosure.

Referring now to FIG. 1B, a diagram of a display 138 from the television 122 of FIG. 1A is shown, in accordance with one embodiment of the present disclosure. The FIG. 1B embodiment is presented for purposes of illustration, and in alternate embodiments, the display 138 may be implemented using components and configurations in addition to, or instead of, certain of those components and configurations discussed in conjunction with the FIG. 1B embodiment.

In the FIG. 1B embodiment, the display 138 includes a main screen region that typically displays video data provided by the content source 114 (FIG. 1A). In the FIG. 1B embodiment, the display 138 also includes a DO 144 that resides in a discrete area displayed on the display 138 to provide any desired type of additional information. In various different embodiments, the DO 144 may be implemented in any desired shape or size, and may be displayed in any appropriate location. Furthermore, any desired number of different DOs are equally contemplated, including the possibility of multiple DOs on the display at any given time.

In the FIG. 1B embodiment, the display 138 supports synchronized DOs that function to provide information that is related (synchronized) to the video data that is currently being displayed on the display 138. For example, the DO 144 may be utilized to display financial information of specific relevance to the viewer (e.g., his/her investment portfolio) during a television program regarding economic news or investment topics. In another example, the DO 144 may be utilized during a televised automobile race to display relevant information or statistics regarding specific race car drivers, race cars, or automobile racing in general. Additional details regarding the implementation and utilization of synchronized DOs 144 is further discussed below in conjunction with FIGS. 2-8.

Referring now to FIG. 2, a block diagram for one embodiment of the FIG. 1A content source 114 is shown, in accordance with the present disclosure. In the FIG. 2 embodiment, the content source 114 may include, but is not limited to, a central processing unit (CPU) 212, a source memory 220, and input/output interfaces (I/O interfaces) 224. In alternate embodiments, the content source 114 may be implemented using components and configurations in addition to, or instead of, those components and configurations discussed in conjunction with the FIG. 2 embodiment. In addition, the content source 114 may alternately be implemented as any other desired type of electronic device or entity.

In the FIG. 2 embodiment, the CPU 212 may be implemented to include any appropriate and compatible microprocessor device(s) that preferably execute software instructions to thereby control and manage the operation of the content source 114. In the FIG. 2 embodiment, the source memory 220 may be implemented to include any combination of desired storage devices, including, but not limited to, read-only memory (ROM), random-access memory (RAM), and various types of non-volatile memory, such as floppy disks or hard disks. The contents and functionality of the source memory 220 are further discussed below in conjunction with FIGS. 3 and 4.

In the FIG. 2 embodiment, the I/O interfaces 224 may include one or more input and/or output interfaces to receive and/or transmit any required types of information for the content source 114. For example, in the FIG. 2 embodiment, the content source 114 may utilize the I/O interfaces 224 to communicate with other entities in the electronic system 110 (FIG. 1A). Furthermore, a system user may utilize the I/O interfaces 224 to communicate with the content source 114 by utilizing any appropriate and effective techniques. Additional details regarding the content source 114 are further discussed below in conjunction with FIGS. 3-4.

Figure 3:
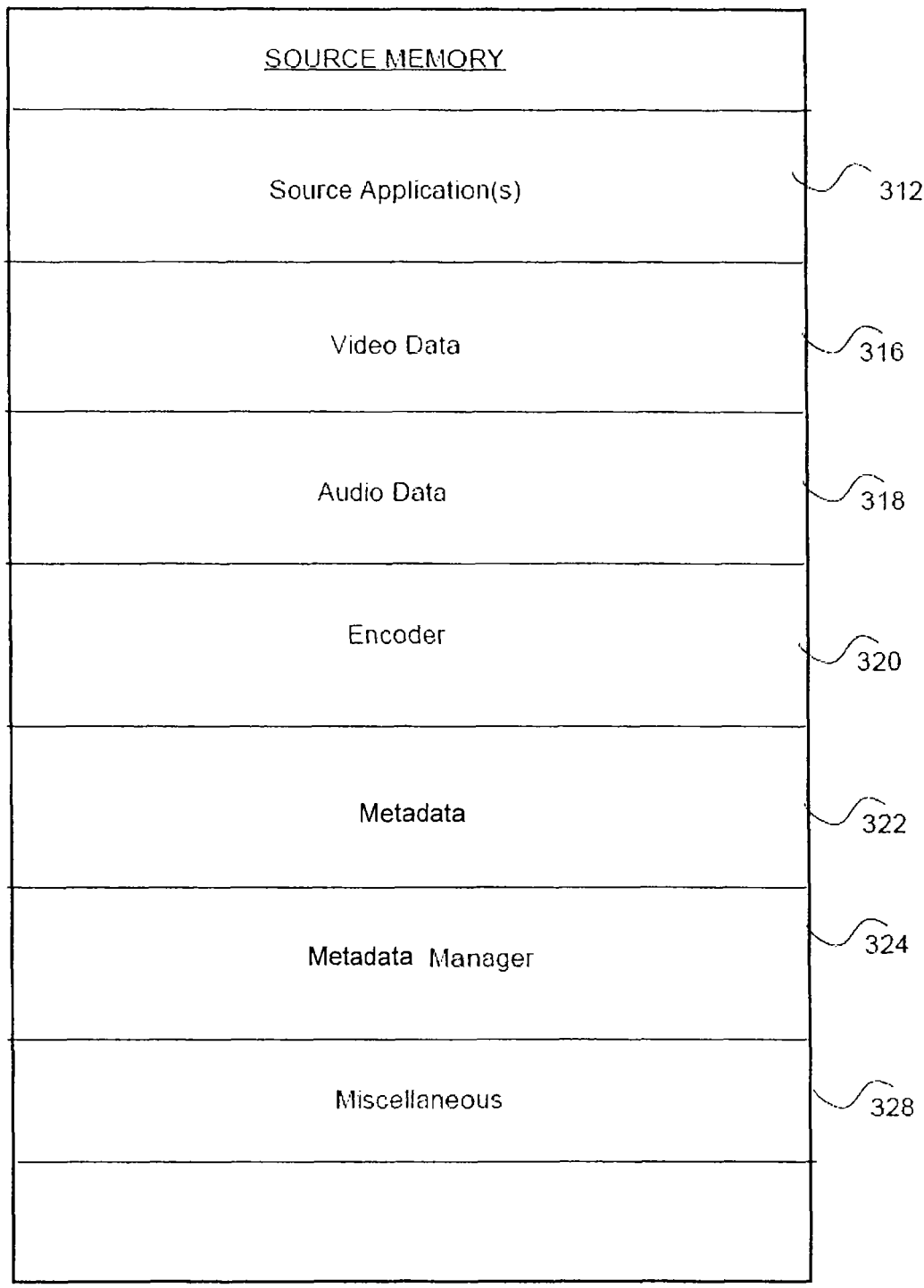
FIG. 3 is a block diagram for one embodiment of the source memory of FIG. 2, in accordance with the present disclosure.

Referring now to FIG. 3, a block diagram for one embodiment of the FIG. 2 source memory 220 is shown, in accordance with the present disclosure. In the FIG. 3 embodiment, the source memory 220 includes, but is not limited to, one or more source applications 312, video data 316, audio data 318, an encoder 320, metadata 322, a metadata manager 324, and miscellaneous information 328. In alternate embodiments, the source memory 220 may include components in addition to, or instead of, those components discussed in conjunction with the FIG. 3 embodiment.

In the FIG. 3 embodiment, the source application(s) 312 may include program instructions that are preferably executed by the CPU 212 (FIG. 2) to perform various functions and operations for the content source 114. The particular nature and functionality of the source application(s) 312 preferably varies depending upon factors such as the specific type and particular functionality of the corresponding content source 114. In the FIG. 3 embodiment, the video data 316 may include any appropriate information or data for display on, or for processing within, the television 122 (FIG. 1A). Similarly, the audio data 318 may include any appropriate information or data for reproduction by television 122 (FIG. 1A).

In the FIG. 3 embodiment, the encoder 320 is configured to convert the video data 316 and the audio data 318 into a compressed distribution multiplex for distribution to television 122. In the FIG. 3 embodiment, the metadata manager 324 coordinates and manages various functions for creating the metadata 322, and embedding the metadata 322 as an integral part of the video data 316, in accordance with the present disclosure. The miscellaneous information 328 may include any additional information for utilization by the content source 114.

In the FIG. 3 embodiment, the present disclosure is disclosed and discussed as being implemented primarily as software. However, in alternate embodiments, some or all of the functions of the present disclosure may be performed by appropriate electronic hardware circuits that are configured for performing various functions that are equivalent to those functions of the software modules discussed herein. Additional details regarding the functionality of the metadata manager 324 and the metadata 322 are further discussed below in conjunction with FIGS. 4, 7, and 8.

Figure 4:
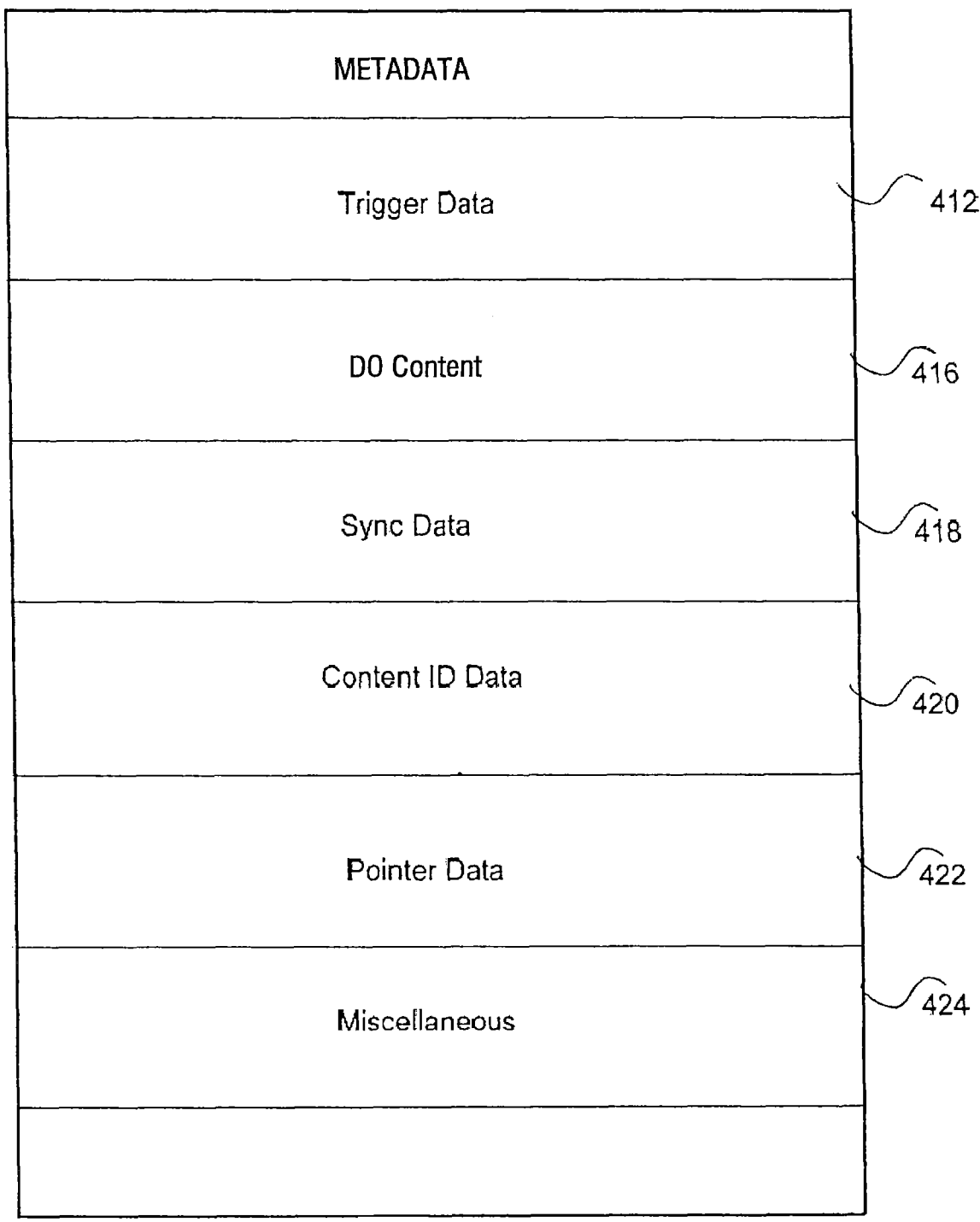
FIG. 4 is a block diagram for one embodiment of the metadata of FIG. 3, in accordance with the present disclosure.

Referring now to FIG. 4, a block diagram of the FIG. 3 metadata 322 is shown, in accordance with one embodiment of the present disclosure. In the FIG. 4 embodiment, the metadata 322 may include, but is not limited to, trigger data 412, DO content 416, synchronization (sync) data 418, content identification (ID) data 420, pointer data 422, and miscellaneous information 424. In alternate embodiments, the metadata 322 may be implemented using various components and functionalities in addition to, or instead of, those components and functionalities discussed in conjunction with the FIG. 4 embodiment.

In the FIG. 4 embodiment, trigger data 412 may include any type of information for controlling processes related to the DO 144 (FIG. 1B). For example, the trigger data 412 may include, but is not limited to, data that defines the DO 144 with respect to visual appearance and behavior, information presented by a DO (such as readout values), DO graphical states (such as colors, levels, or settings), and optimal DO location, shape, size, and display times. In certain embodiments, the trigger data 412 contains one or more triggers that perform various timing-related signaling functions in support of interactive services, as defined in ATSC Candidate Standard A/105:2014, as referenced above.

In the FIG. 4 embodiment, the DO content 416 may include any content data for display in the DO 144. In certain embodiments, The DO content 416 may alternately be obtained from sources or entities other than the metadata 322. In the FIG. 4 embodiment, the synchronization (sync) data 418 may include any appropriate means for allowing the television 122 to detect the metadata 322 while it is embedded in video data 316. In certain embodiments, the sync data 418 may include a pre-defined identification pattern that indicates the specific location of the metadata 322 within video data 316.

In the FIG. 4 embodiment, metadata 322 may be encoded within video by use of the luminance (brightness) values of the video. For example, on one video line, each set of a predetermined number of pixels (e.g. 8) may be encoded with one "symbol," wherein the luminance value of each pixel is set to one of four values (e.g., 0-3). In this case, each symbol carries two bits of information. In other embodiments, each set of pixels may be set to one of two levels (e.g., 0 or 1). In that case, each symbol carries one bit of information.

In one embodiment, a predetermined number of symbols (e.g., 8 or 16) is used to define a predetermined run-in pattern that is used to indicate whether a video frame is marked. For example, in an embodiment where each pixel is set to one of four values, the first eight symbols may be set to a fixed pattern, [3, 3, 0, 0, 2, 1, 3, 0], to allow a detector to quickly identify whether or not the video includes a watermark. When each symbol corresponds to 1-bit, the fixed pattern could be [1, 1, 1, 1, 0, 0, 0, 0, 1, 0, 0, 1, 0, 1, 1, 0] with the number of symbols increased (e.g., to 16). Further, different run-in patterns may be used for different protocol versions such that backwards compatibility may be achieved by assuring that implementations of the 1.0 version discard any data not including the version 1.0 run-in pattern.

In the FIG. 4 embodiment, the content ID data 420 may include any appropriate information for identifying the specific content of a given corresponding program. In one embodiment, the content ID data 420 may include an International Standard Audio-Visual Number (ISAN) number as an identifier. In another embodiment, the content ID data 420 may include an Entertainment Industry Data Registry (EIDR) code and/or a media time. For example, the content ID data 420 may include a content ID message that is designed to carry a 12-byte EIDR code and a 2-byte media time. Exemplary bitstream syntax of the Content ID message is as follows:

| Syntax | No. of Bits | Format |
| --- | --- | --- |
| content_id_message( ) { | | |
|     table_id | 8 | 0x01 |
|     table_length | 8 | uimsbf |
|     EIDR | 96 | uimsbf |
|     media_time | 16 | uimsbf |
|     CRC_32 | 32 | uimsbf |
| } | | | table_id—Set to value 0x01. Identifies the data to follow as a content id_message( ).

table_length—Indicates the number of bytes to follow to the end of the CRC. In this case the value is 18.

EIDR—A 96-bit value intended to carry the value of the Entertainment Industry Data Registry (EIDR) code for this content item.

media_time—A 16-bit number representing the media time within the content in seconds, where value zero indicates the first second of the content item.

CRC_32—A 32-bit CRC checksum over the full message, up to but not including the CRC_32 field itself. An exemplary generating polynomial is $1+x+x^2+x^4+x^5+x^7 x^8+x^{10}+x^{11}+x^{12}+x^{16}+x^{22}+x^{23}+x^{26}$.

In one embodiment, the content ID message may further, or alternatively, include an Ad-ID field for commercial material. The Ad-ID field is a 96-bit field that represents the Ad-ID code associated with the content.

In the FIG. 4 embodiment, the pointer data 422 may include any type of required information that television 122 utilizes to locate and obtain additional information (such as DO content or trigger data) for use in producing the synchronized DOs 144. For example, the pointer data 422 may include, but is not limited to, a URL that identifies an Internet location where more information pertaining to the currently-displayed video data 316 may be found. The URL could represent a website on the server 130 (FIG. 1A) or elsewhere providing more information about a product being advertised, a URL of a home page of an episode or series, a website where a viewer could sign up for a service or vote on a program, etc.

In the FIG. 4 embodiment, the miscellaneous information 424 may include any additional information for utilization by the television 122. For example, in certain embodiments, the miscellaneous information 424 may include one or more scripts or executable programs. In one embodiment, the miscellaneous information 424 includes a frame count message. The purpose of the frame count message is to provide finer granularity to the timing given in the media_time field of the Content ID message, and to indicate the original frame rate of the content (at the time the watermark was applied). Exemplary bit stream syntax of the frame count message is as follows:

| Syntax | No. of Bits | Format |
|---|---|---|
| frame_count_message( ) { | | |
|     table_id | 8 | 0x02 |
|     table_length | 8 | uimsbf |
|     original_frame_rate | 8 | uimsbf |
|     frame | 8 | uimsbf |
|     CRC_32 | 32 | uimsbf |
| } | | | table_id—Set to value 0x02. Identifies the data to follow as a frame_count_message( ).

table_length—Indicates the number of bytes to follow. In this case the value was set to 6.

original_frame_rate—An 8-bit unsigned integer indicating the frame rate, in frames per second, of the original content at the time the watermark is applied. The value is set to 24 for animated content and 30 for other content types.

frame—An 8-bit unsigned integer indicating the frame number within the one-second period identified by media_time. The count is zero-based.

CRC_32—A 32-bit CRC checksum over the full message, up to but not including the CRC_32 field itself. An exemplary generating polynomial is $1+x+x^2+x^4+x^5+x^7+x^8+x^{10}+x^{11}+x^{12}+x^{16}+x^{22}+x^{23}+x^{26}$.

Additional details regarding the creation, distribution, and utilization of the metadata 322 are further discussed below in conjunction with FIGS. 7 and 8.

Figure 5:
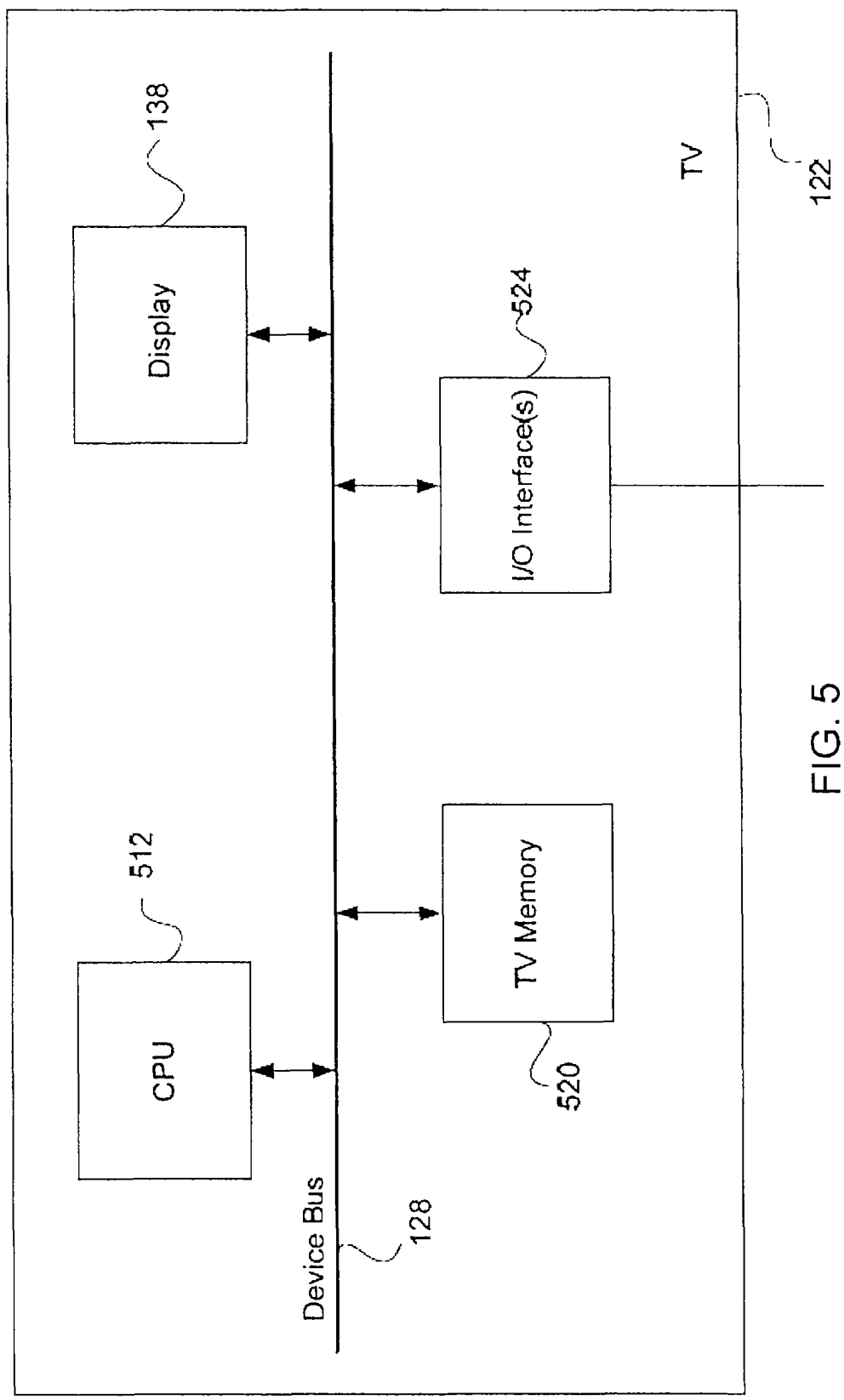
FIG. 5 is a block diagram for one embodiment of the television from FIG. 1A, in accordance with the present disclosure.

Referring now to FIG. 5, a block diagram for one embodiment of the FIG. 1A television (TV) 122 is shown, in accordance with the present disclosure. In the FIG. 5 embodiment, the TV 122 may include, but is not limited to, a central processing unit (CPU) 512, a display 138, a TV memory 520, and input/output interfaces (I/O interfaces) 524. In alternate embodiments, the TV 122 may be implemented using components and configurations in addition to, or instead of, those components and configurations discussed in conjunction with the FIG. 5 embodiment. In addition, the TV 122 may alternately be implemented as any other desired type of electronic device or entity.

In the FIG. 5 embodiment, the CPU 512 may be implemented to include any appropriate and compatible microprocessor device(s) that preferably execute software instructions to thereby control and manage the operation of the TV 122. The FIG. 5 display 138 may include any effective type of display technology including a liquid-crystal display device with an appropriate screen for displaying various information to a device user. In the FIG. 5 embodiment, the TV memory 520 may be implemented to include any combination of desired storage devices, including, but not limited to, read-only memory (ROM), random-access memory (RAM), and various types of non-volatile memory, such as floppy disks or hard disks. The contents and functionality of TV memory 520 are further discussed below in conjunction with FIG. 6.

In the FIG. 5 embodiment, the I/O interfaces 524 may include one or more input and/or output interfaces to receive and/or transmit any required types of information for the TV 122. For example, in the FIG. 5 embodiment, the TV 122 may utilize the I/O interfaces 524 to communicate with other entities in the electronic system 110 (FIG. 1A). Furthermore, a system user may utilize I/O interfaces 524 to communicate with the TV 122 by utilizing any appropriate and effective techniques. Additional details regarding the TV 122 are further discussed below in conjunction with FIGS. 6-8.

Figure 6:
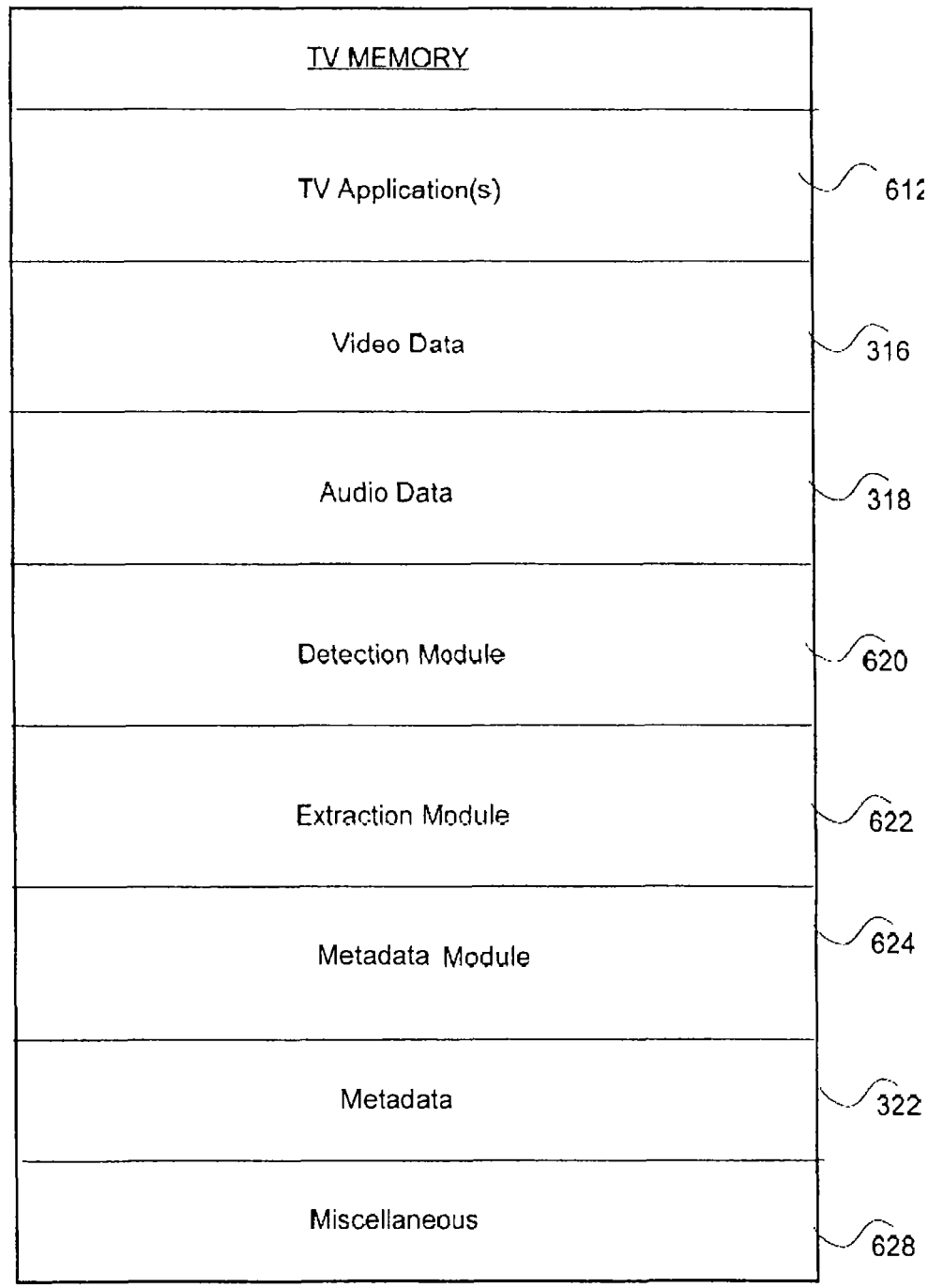
FIG. 6 is a block diagram for one embodiment of the TV memory from FIG. 5, in accordance with the present disclosure.

Referring now to FIG. 6, a block diagram for one embodiment of the FIG. 5 TV memory 520 is shown, in accordance with the present disclosure. In the FIG. 6 embodiment, the TV memory 520 includes, but is not limited to, one or more TV applications 612, video data 316, audio data 318, a detection module 620, and extraction module 622, a metadata module 624, metadata 322, and miscellaneous information 628. In alternate embodiments, the TV memory 520 may include components in addition to, or instead of, those components discussed in conjunction with the FIG. 6 embodiment.

In the FIG. 6 embodiment, the TV application(s) 612 may include program instructions that are preferably executed by the CPU 512 (FIG. 5) to perform various functions and operations for the TV 122. The particular nature and functionality of the TV application(s) 612 preferably varies depending upon factors such as the specific type and particular functionality of the corresponding TV 122. In the FIG. 6 embodiment, the video data 316 may include any appropriate information or data for display on the television 122 (FIG. 1A). Similarly, the audio data 318 may include any appropriate information or data for reproduction by the television 122 (FIG. 1A).

In the FIG. 6 embodiment, the detection module 620 may be utilized by TV 122 to detect and locate the metadata 322 that has been embedded in the video data 316, as discussed above. In the FIG. 6 embodiment, the extraction module 620 may be utilized by the TV 122 to remove the detected metadata 322 from the video data 316. In the FIG. 6 embodiment, the metadata module 624 coordinates and manages various functions for processing the extracted metadata 322 to effectively support synchronized DOs 144 (FIG. 1B) or other TV applications, in accordance with the present disclosure. The miscellaneous information 628 may include any additional information for utilization by the TV 122.

In the FIG. 6 embodiment, the present disclosure is disclosed and discussed as being implemented primarily as software. However, in alternate embodiments, some or all of the functions of the present disclosure may be performed by appropriate electronic hardware circuits that are configured for performing various functions that are equivalent to those functions of the software modules discussed herein. Additional details regarding the functionality of the metadata module 624 and metadata 322 are further discussed below in conjunction with FIGS. 7 and 8.

Embodiments of the present disclosure embed the metadata 322 as a watermark using luminance values of a video frame. The luminance values are bound within the range [16, 235]. The luminance value 16 corresponds to black and the luminance value 235 corresponds to white, as defined in ITU-R Recommendation BT.709, which is incorporated herein by reference in its entirety. One watermark data symbol is encoded into M pixels (where M is typically 6, 8, or 16). Each symbol encodes one or more data bits. When one-bit-per-symbol encoding is used, each pixel has one of two possible values, such that symbol values can be either zero or 100% and a threshold value of 50% luminance is used to distinguish '1' bits from '0' bits. When two-bits-per-symbol coding is used, each pixel has one of four possible values, such that symbol values can be zero, 33.33%, 66.67%, or 100% luminance, and threshold values of 16.67%, 50%, and 83.33% may be used. Alternatively, lower values of luminance can be used, to reduce visibility. A tradeoff between robustness against heavy compression or video transcoding versus visibility can be made by selection of luminance ranges and values.

Figure 9:
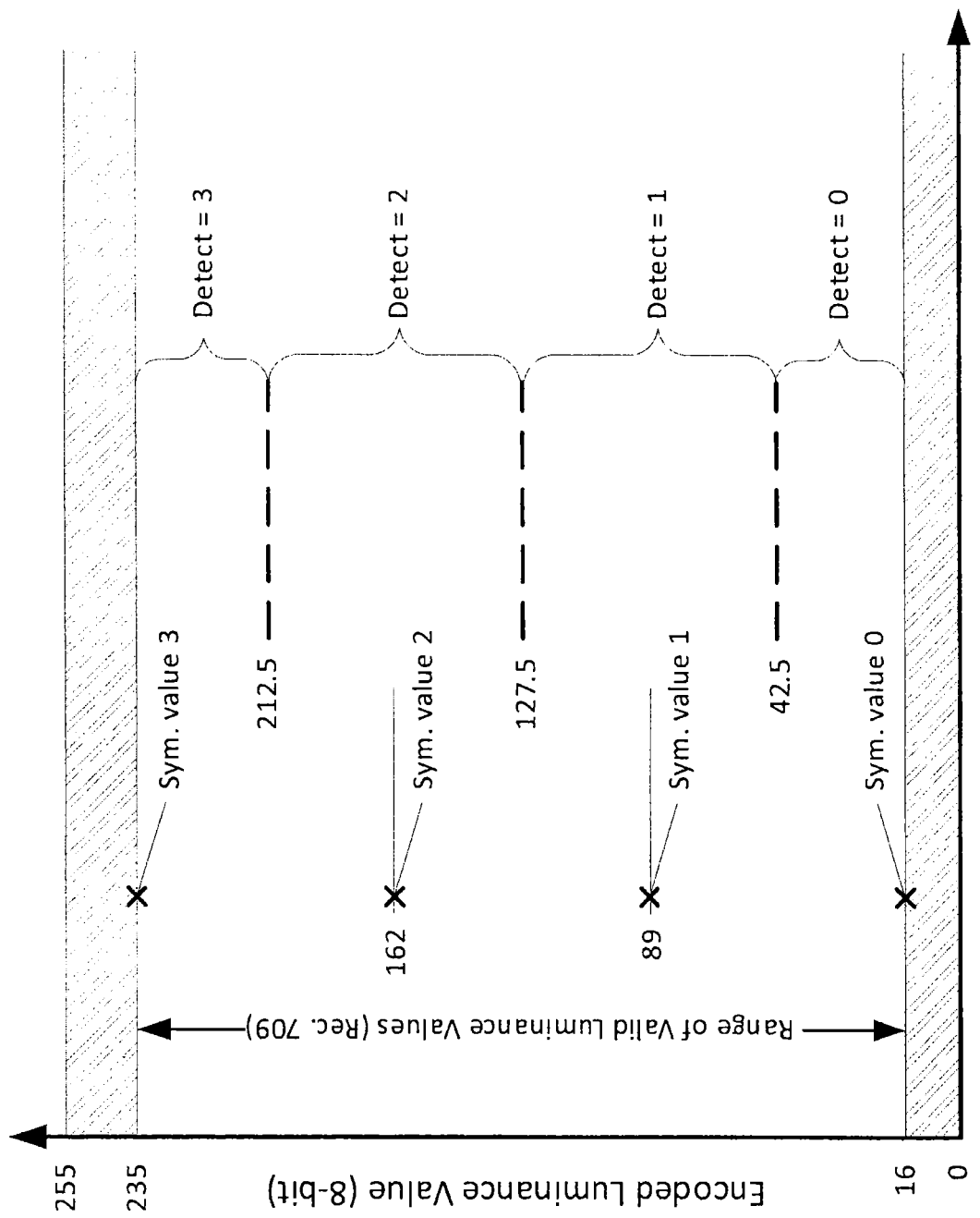
FIG. 9 illustrates an example of luminance encoding.

An example of two-bits-per-symbol coding is illustrated in FIG. 9. The symbols representing the watermark data use four different equally-spaced luminance values: 16, 89, 162, and 235 (decimal). The threshold values for decoding are shown in FIG. 9. A symbol value 0 is detected if the luminance is less than or equal to 42, value 1 is detected if the luminance is in the range 43 to 127, value 2 is detected if the luminance is in the range 128 to 212, and value 3 is detected if luminance is 213 or above. While in the majority of cases, televisions do not display the top or bottom few lines of video, a problem which arises from using such a luminance encoding scheme is that the embedded watermark may be visible to a viewer if the portion of the video frame occupied by the watermark is displayed on the TV 122.

To reduce visibility of the watermark, embodiments of the present disclosure use one or a combination of different methods including (1) decreasing the data capacity of the watermark; (2) using a luminance value below "black"; and (3) decreasing the rate that the watermark changes (e.g., once per a second instead of per a frame).

In certain embodiments, metadata is embedded in line 1 of the video data. Video in line 1 consists of N encoded pixels (for HD or UHD content, usually 1280, 1920, or 3840). As noted above, one watermark data symbol is encoded into M pixels (where M is typically 6, 8, or 16). Further, in one embodiment, the same metadata is also embedded in line 2 for better robustness due to errors that may be introduced in encoding or re-encoding. Due to the nature of video encoding, the integrity of metadata on line 1 has been found to be improved if the same data is repeated on line 2.

To reduce visibility of the embedded metadata, in one embodiment, the data capacity of the watermark can be decreased. For example, 60 bytes of data can be encoded per a line, when the number of horizontal pixels per a line is 1920, the number of pixels per a symbol is 8, and the number of bits encoded per symbol is 2. However, in order to encode 2 bits per a symbol, a larger range of luminance values must be used. To decrease the visibility of the watermark, the data capacity of the watermark can be reduced such that the maximum luminance value required to identify a symbol value is decreased, for example from the value 235. For example, luminance values 16 and 89, instead of 16, 89, 162, and 235, could be used to encode the watermark when the number of bits encoded per symbol is reduced to 1, which results in 30 bytes of data being encoded per a line.

In one embodiment, using a luminance value below black decreases visibility of the watermark. Video standards specify that luminance values range from 16 (black) to 235 (white) when encoded as 8 bits. A luminance value of 0 (or any other value below 16) can survive transcoding. Using a minimum luminance value of 0 instead of 16 allows for a reduction in the maximum luminance value needed to encode the watermark and improves robustness. For example, for 1-bit per symbol encoding, the range 16 to 89 can be reduced to 0 to 73 with no loss in robustness. In one embodiment, the luminance range is set to 0 to 42 for 1-bit per symbol encoding. The luminance value 42 is a level of dark gray that is nearly imperceptible. However, any luminance value range may be set in which the range starts at a value below 16 in certain embodiments. In certain embodiments, luminance values above 235 may be used to increase the range of luminance values used for encoding or shift the range of luminance values to higher values.

In one embodiment, the rate that the watermark changes from frame to frame is decreased to reduce visibility of the watermark embedded in the video data 316. For example, the same watermark may be embedded in a predetermined number of frames, or for a predetermined amount of time (e.g., 1 second) before being changed, instead of being changed once per a frame. Although this reduces the rate at which data is transmitted, decreasing the rate of change reduces possible distraction to a viewer that can result from frequently changing pixel luminance values when the watermark is within a visible area of the display.

The number of horizontal pixels representing one symbol varies depending on horizontal resolution. In one embodiment, 16 pixels per symbol for the 3840 horizontal resolution is utilized to allow the video watermark to be preserved during down-resolution from 4K to 2K.

Figure 7B:
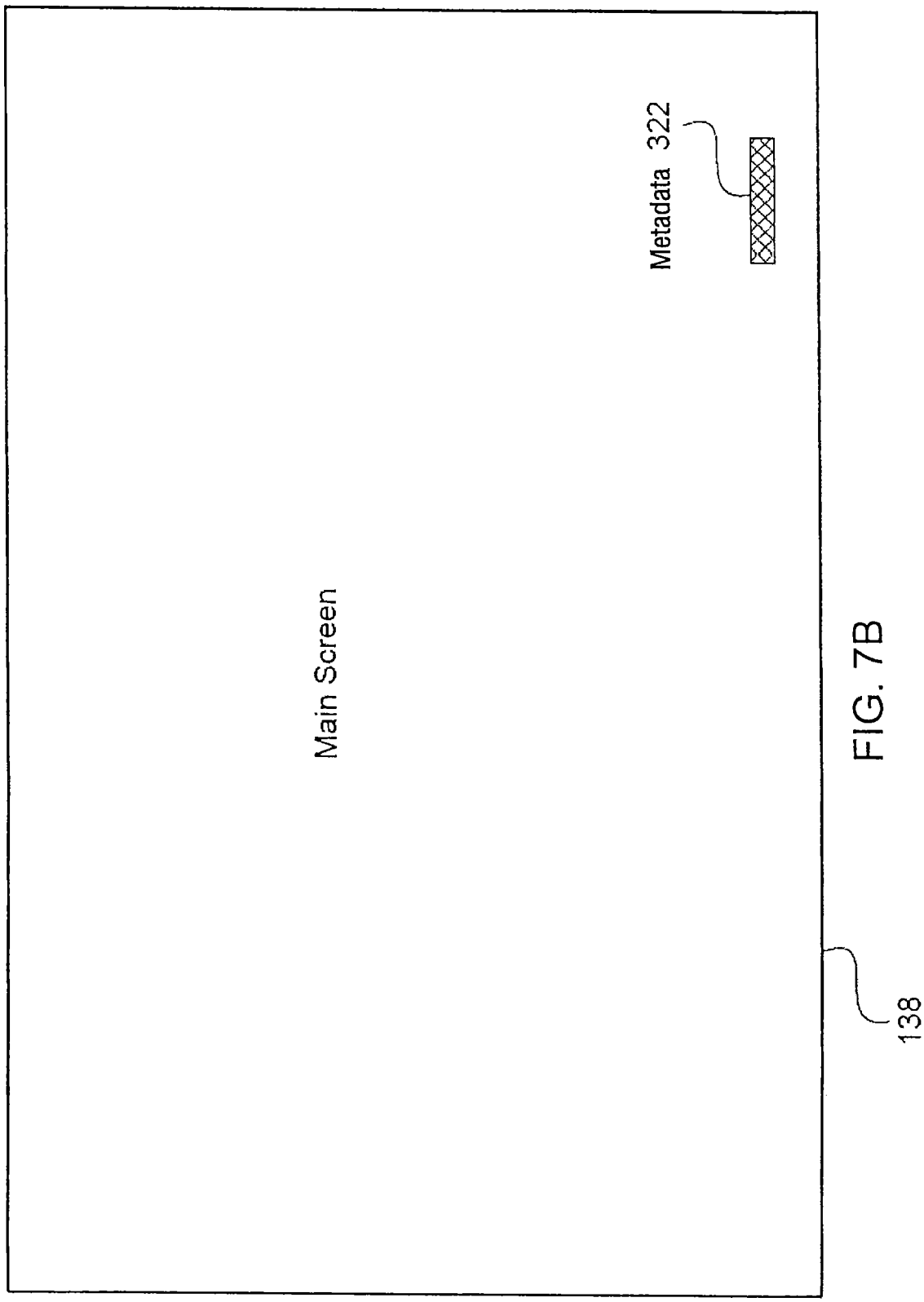

Referring now to FIGS. 7A and 7B, diagrams of metadata 322 embedded in video data 316 are shown, in accordance with two different embodiments of the present disclosure. FIGS. 7A and 7B present a frontal view of a display 138 from the TV 122 (FIG. 1A). The embodiments of FIGS. 7A and 7B are presented for purposes of illustration, and in alternate embodiments, the metadata 322 may be embedded using techniques and configurations in addition to, or instead of, certain of those techniques and configurations discussed in conjunction with the embodiments of FIGS. 7A and 7B. For example, metadata 322 may be placed at the bottom of the display in some embodiments.

In the FIG. 7A embodiment, the display 138 includes a main screen region that typically displays the video data 316 provided by the content source 114 (FIG. 1A). In the FIG. 7A embodiment, the displayed video data 316 on the display 138 also includes that embedded metadata 322 that is located in an unobtrusive area of display 138. In various different embodiments, the metadata 322 may be implemented in any desired shape or size, and may be displayed in any appropriate location(s) on the display 138. For purposes of illustration, the location of the metadata 322 in FIG. 7A is indicated as a thin cross-hatched line. However, any effective configuration or location is equally contemplated for implementing the metadata 322.

In the FIG. 7A embodiment, the metadata 322 may be encoded to represent the required information (see FIG. 4) in any effective manner. For example, in certain embodiments, the metadata 322 may be formatted as one or more horizontal lines of digital video information positioned in or near the region of the video signal's vertical blanking interval (VBI). Because a digital television signal is often encoded with 1280 to 1920 horizontal pixels per scan line, the FIG. 7A VBI configuration for the metadata 322 may provide a substantial amount of digital information to the TV 122.

The present disclosure thus supports a method of camouflaging the metadata 322 in the video data 316 so that a portion of active video (potentially visible to the viewer) is used to convey the metadata 322. In addition, the present disclosure includes standardizing an encoding format for the video metadata 322 to survive video compression and decompression. The present disclosure further supports embedding the metadata 322 in the video image so that the metadata 322 can be recovered (detected, extracted, and processed by TV 122) in a standardized way, without excessive CPU overhead. The implementation and utilization of the metadata 322 are further discussed below in conjunction with FIGS. 8A-8C.

In the FIG. 7B embodiment, the display 138 includes a main screen region that typically displays the video data 316 provided by the content source 114 (FIG. 1A). In the FIG. 7B embodiment, the displayed video data 316 on display 138 also includes the embedded metadata 322 that is preferably located in an unobtrusive area of display 138. In various, different embodiments, the metadata 322 may be implemented in any desired shape or size, and may be displayed in any appropriate location(s) on display 138. For purposes of illustration, the location of the metadata 322 in FIG. 7B is indicated as a small cross-hatched rectangle. However, any effective configuration or location is equally contemplated for implementing the metadata 322.

In the FIG. 7B embodiment, the metadata 322 may be encoded to represent any required information (see FIG. 4) in any effective manner. For example, in certain embodiments, the metadata 322 may be formatted by utilizing conventional or enhanced bar code technologies. In other words, the metadata 322 could be effectively formatted as a video two-dimensional bar code that is embedded in a corner or at the edge of the displayed video data 316. In addition, the bar code or other formatting of the metadata 322 could be displayed as a part of a small graphical logo icon known as a "bug." Furthermore, in various other embodiments, the metadata 322 may be encoded or displayed by utilizing any other effective techniques. Such an encoding of the metadata 322 could represent a substantial amount of information, and could be quite small and dense, as the metadata 322 would be read by the TV 122 processing video data 316 in video memory. Where printed barcodes are optimized for readout by laser scanners, the type of video barcode used for the metadata 322 is embedded in a digital video signal, which is processed directly by the TV 122 (as pixel luminance or chrominance samples).

In certain embodiments, quantization errors in the video compression could possibly obliterate a video barcode (so a bar code occurring within a fast-moving, hard-to-compress video sequence might not survive). However, if the bar code is left on-screen for some amount of time (a few seconds), that concern is mitigated. The resulting barcode image may not need to be shown with high contrast (black lines on white background), since TV 122 will be able to extract the information via a filtering mechanism. The bar code could thus be encoded with various shades of gray (as long as there is enough contrast for reliable extraction). For example, the bar code could be displayed using a luminance value below 16, using 1-bit per a symbol encoding, and/or reduced change rates, as described above.

As discussed above, the metadata 322 could be displayed in conjunction with a graphical logo icon ("bug"), as a caption or border, or it could be placed at one more of the extreme edges of the image (because these are usually cropped before display, and are less obtrusive in any case). The bits of the metadata 322 could be spread out spatially over the area of the video frame if the pattern of their location was known to the TV 122 beforehand. Even a small amount of the metadata 322, such as the content ID data 420 or the pointer data 422 of FIG. 4, can be of great help in enhancing the user experience, as this information can be expanded via an interaction with a web server 130 (see FIG. 1A) to obtain additional required information including, but not limited to, the metadata 322 or content data.

Referring now to FIGS. 8A-8C, a flowchart of method steps for distributing the metadata 322 embedded in the video data 316 is shown, in accordance with one embodiment of the present disclosure. The FIG. 8 example is presented for purposes of illustration, and in alternate embodiments, the present disclosure may utilize steps and sequences other than certain of those steps and sequences discussed in conjunction with the FIG. 8 embodiment.

In the FIG. 8A embodiment, in step 812, the content source 114 or other appropriate entity initially produces A/V content data that typically includes the video data 316 and the audio data 318. In step 814, the content source 114 or other appropriate entity then creates the metadata 322 to support various advanced interactive features on the television device 122, such as displaying one or more synchronized DOs 144. In step 816, the content source 114 or other appropriate entity inserts the metadata 322 into the video data 316.

Figure 10:
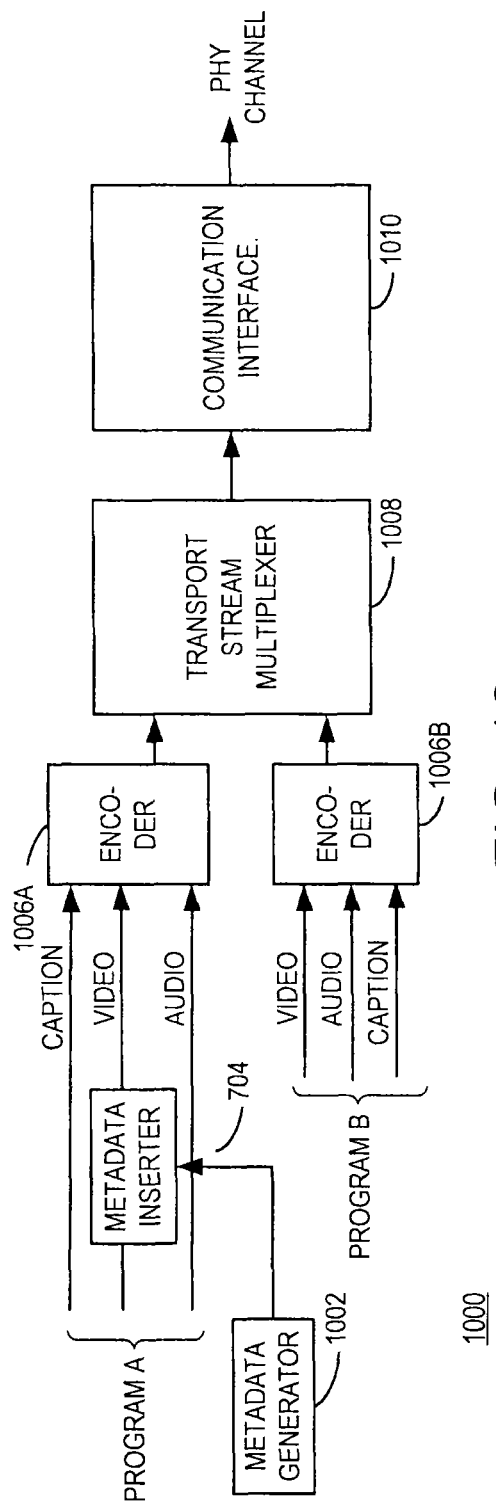
FIG. 10 illustrates an exemplary information providing apparatus.

An example of the insertion in the content source 114 is illustrated in FIG. 10. FIG. 10 is a basic diagram of an exemplary information providing apparatus, which for example is utilized by the content source 114. Generally speaking, a single content provider may provide multiple programs (e.g. Programs A and B) over one or more transport streams. For example, audio, video, and caption data for Program A are provided to an encoder 1006A while audio, video, and caption data for Program B are provided to an encoder 1006B. A transport stream multiplexer 1008 receives the outputs from the encoders 1006A, 1006B and provides an output that can be distributed via a physical channel medium such as a terrestrial, cable, satellite broadcast. A communication interface 1010 (e.g., a broadcast transmitter) distributes the output from the transport stream multiplexer via the physical channel medium.

The information providing apparatus 1000 further includes a metadata generator 1002 and metadata inserter 1004. The metadata generator 1002 generates metadata to be embedded in the video portions of Program A.

The metadata inserter 1004 embeds the generated metadata in the video portions of Program A. In certain embodiments, the metadata inserter 1004 encodes the generated metadata within luminance values in one or more lines (e.g., lines 1 and optionally line 2) of active video. The metadata inserter 1002 encodes each of the metadata in a different frame, or each of the one or more lines, of the video. As described above, the metadata may be repeated for a predetermined number of frames.

The metadata inserter 1004 optionally repeats the encoding of the generated metadata in line 2 for better robustness due to errors that may be introduced in encoding or re-encoding. Due to the nature of video encoding, the integrity of metadata on line 1 has been found to be improved if the same data is repeated on line 2.

In step 818, the content source 114 or other appropriate entity compresses the audio data 318 and the video data 316 (including the embedded metadata 322) to create a compressed distribution multiplex in step 820. The FIG. 8A process then advances to step 822 of FIG. 8B through connecting letter "A."

In step 822 of FIG. 8B, a set-top box 118 or other appropriate entity (e.g., the television) receives and demultiplexes the distribution multiplex distributed by the content source 114 to produce compressed audio data and video data. In step 824, a decoder device of the set-top box 118 or other appropriate entity then uncompresses the compressed audio data and video data to produce uncompressed audio data 318 and uncompressed video data 316 (including the embedded metadata 322). In step 826, the set-top box 118 or other appropriate entity formats the audio data 318 and the video data 316 for delivery to the display 138 of the television 122. The FIG. 8B process then advances to step 828 of FIG. 8C through connecting letter "B."

Figure 8D:
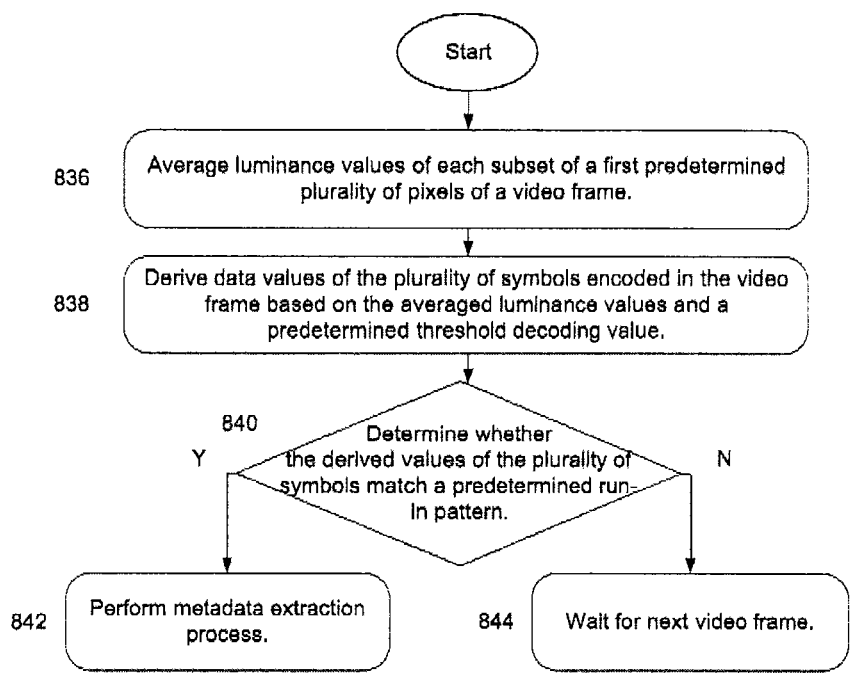

In step 828 of FIG. 8C, the television 122 or other appropriate entity receives or further processes the uncompressed audio data 318 and uncompressed video data 316 (including the embedded metadata 322). For example, the television 122 determines the luminance values of pixels within a predetermined portion or portions of a video frame (e.g., lines 1 and/or 2). In step 830, the detection module 620 of the television 122 scans the video data 316 to detect the embedded metadata 322 by utilizing any effective techniques (e.g., by detecting the presence of the run-in pattern). In one embodiment, the first sixteen symbols encoded in the predetermined portion of a video frame (e.g., the first 128 pixels of a first line of a video frame, when each symbol is represented by 8 pixels and the run-in pattern is made up of 16 symbols) is analyzed to determine if the metadata 322 is embedded in the video frame. For example, in step 836 of FIG. 8D, the television 122 averages the luminance values of each subset (e.g., subset of 8 pixels) of a first predetermined plurality of pixels (e.g., the first 128 pixels) corresponding to a possible run-in pattern. The symbol values are then determined based on the average luminance values and a predetermined threshold decoding value in step 838. For example, when eight pixels make up a symbol, the television 122 averages the luminance values in the eight pixels making up the symbol and determines whether the symbol is a "1" or "0" based on luminance threshold decoding values. For example, for 1-bit per a symbol coding, the television 122 determines that the symbol is "0" when the detected average luminance is less than or equal to a predetermined percentage (e.g., 50%) of an encoding range, and the symbol is "1" when the detected average luminance is greater than the predetermined percentage of the encoding range. In step 840, the television 122 determines whether the metadata 322 is included in the video frame based on whether the derived data values of the symbols matches a predetermined run-in pattern (e.g., [1, 1, 1, 1, 0, 0, 0, 0, 1, 0, 0, 1, 0, 1, 1, 0]). If a match is detected, the television 122 proceeds to extract the metadata in step 842. If a match is not detected, the television 122 waits for the next video frame.

Figure 8E:
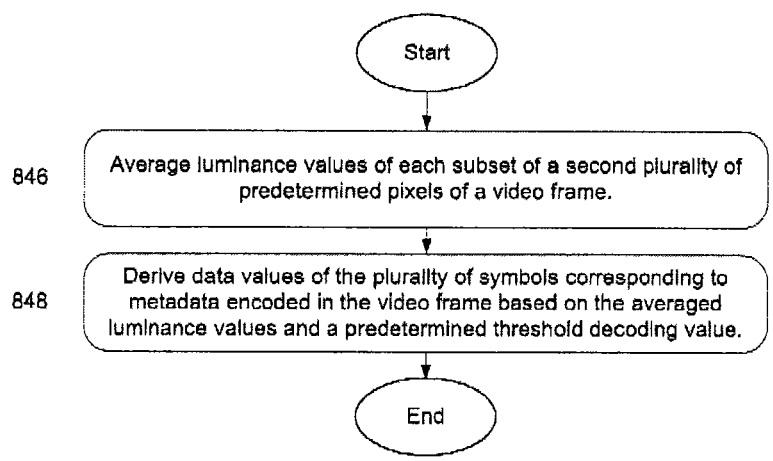

In step 832, the extraction module 622 of the television 122 extracts the located metadata 322 from the video data 316. In one embodiment, the television 122 determines symbol values of the watermark representing the embedded metadata based on the luminance values in pixels of a portion (e.g., first line) of a video frame of the content, as illustrated in FIG. 8E. In step 846, the television 122 averages luminance values of each subset of a second predetermined plurality of pixels of a video frame (e.g., the remaining pixels in line 1 that correspond to the metadata 322 and follow the pixels corresponding to the run-in pattern). In step 848, the television 122 derives data values of the plurality of symbols, which correspond to the metadata 322 encoded in the video frame, based on the averaged luminance values and a predetermined threshold decoding value. For example, as described above, when eight pixels make up a symbol, the television 122 averages the luminance values in the eight pixels making up the symbol and determines whether the symbol is a "1" or "0" based on luminance threshold decoding values. For example, for 1-bit per a symbol coding, the television 122 determines that the symbol is "0" when the detected average luminance is less than or equal to a predetermined percentage (e.g., 50%) of an encoding range, and the symbol is "1" when the detected average luminance is greater than the predetermined percentage of the encoding range.

Finally, in step 834, the metadata module 624 processes the extracted metadata 322 to successfully support appropriate advanced features, such as displaying one or more synchronized DOs 144 on the display 138 of the television 122. The FIG. 8C process may then terminate.

In one embodiment, the television 122 could recognize a channel change (or change of content) either by detecting that the content is no longer Marked (e.g., watermark no longer detected), or by detecting a frame of Marked Content (e.g., a watermark) in which the EIDR value changed. In one embodiment, the content ID is directly identified by the EIDR value in the Content ID Message. In another embodiment, a URL of a remote server or any other information about the content is provided as metadata embedded as the watermark. In another embodiment, two data elements are included in the embedded metadata to identify the media time, the media time in whole seconds is specified in the content ID message while the media time in frames is specified in the frame count message such that timing accuracy is frame-level. Further, the embedded metadata may be used to provide event triggers, that are time-sensitive, in real time.

In certain alternate embodiments, the metadata 322 may similarly be created and inserted into the video data 316 by any other appropriate entity at any point along the distribution path. In certain of these alternate embodiments, the metadata 322 may be inserted without completely decompressing the video data 316. For example, individual macro-blocks of compressed video data 316 (without any metadata 322) could be replaced by corresponding compressed macro-blocks that contain the metadata 322 already embedded. For all of the foregoing reasons, the present disclosure thus provides an improved system and method for distributing metadata embedded in video data.

Figure 11:
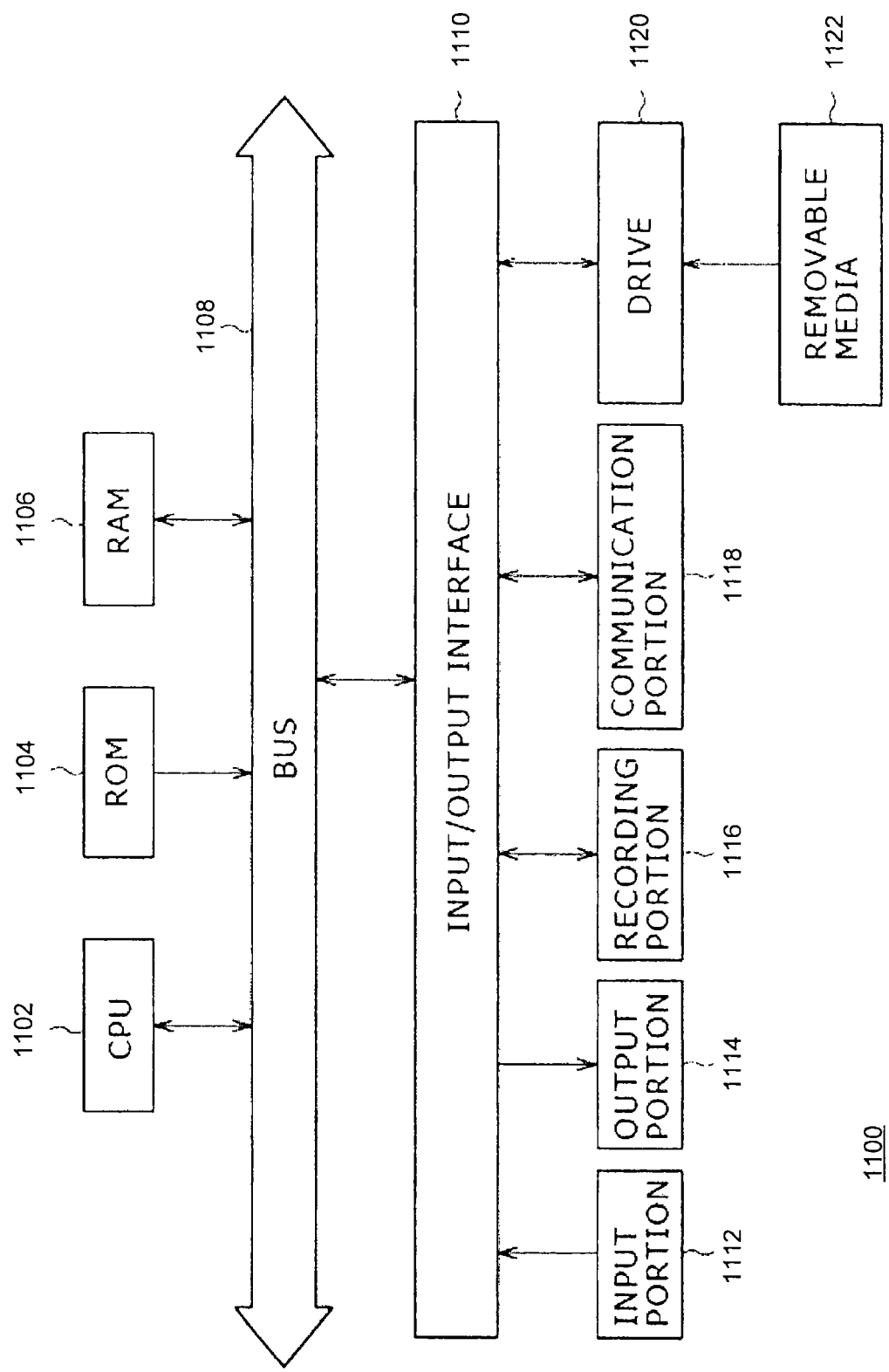
FIG. 11 is an exemplary computer.

FIG. 11 is a block diagram showing an example of a hardware configuration of a computer 1100 configured to perform one or a combination of the functions described above, such as one or more of the functions of the content source 114, settop box 118, television 122, and/or server 130.

As illustrated in FIG. 11, the computer 1100 includes a central processing unit (CPU) 1102, read only memory (ROM) 1104, and a random access memory (RAM) 1106 interconnected to each other via one or more buses 1108. The one or more buses 1108 is further connected with an input-output interface 1110. The input-output interface 1110 is connected with an input portion 1112 formed by a keyboard, a mouse, a microphone, remote controller, etc. The input-output interface 1110 is also connected to a output portion 1114 formed by an audio interface, video interface, display, speaker, etc.; a recording portion 1116 formed by a hard disk, a non-volatile memory, etc.; a communication portion 1118 formed by a network interface, modem, USB interface, FireWire interface, etc.; and a drive 1120 for driving removable media 1122 such as a magnetic disk, an optical disk, a magneto-optical disk, a semiconductor memory, etc.

According to one embodiment, the CPU 1102 loads a program stored in the recording portion 1116 into the RAM 1106 via the input-output interface 1110 and the bus 1108, and then executes a program configured to provide the functionality of the one or combination of the content source 114, settop box 118, television 122, and/or server 130.

The present disclosure has been explained above with reference to certain embodiments. Other embodiments will be apparent to those skilled in the art in light of this disclosure. For example, the present disclosure may readily be implemented using configurations and techniques other than those described in the embodiments above. Additionally, the present disclosure may effectively be used in conjunction with systems other than those described above. Therefore, these and other variations upon the discussed embodiments are intended to be covered by the present disclosure, which is limited only by the appended claims.

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the embodiments of the present disclosure are possible in light of the above teachings. It is therefore to be understood that within the scope of the appended claims, the embodiments may be practiced otherwise than as specifically described herein.

The above disclosure also encompasses the embodiments noted below.

(1) A method of a reception apparatus for extracting metadata, the method including: processing, by circuitry of the reception apparatus, content that includes the metadata embedded therein, the metadata being embedded as a watermark in a first portion of a video frame of the content; and determining, by the circuitry, symbol values of the watermark embedded in the video frame based on luminance values in pixels of the first portion of the video frame of the content to extract the metadata, in which at least one of the luminance values is less than 16.

(2) The method of feature (1), in which the same watermark is embedded in a plurality of consecutive video frames of the content.

(3) The method of feature (1) or (2), further including detecting a predetermined fixed pattern of symbol values based on luminance values in pixels of a second portion of the video frame of the content, wherein the step of determining determines the metadata when the predetermined fixed pattern is detected to extract the metadata.

(4) The method according to any one of features (1) to (3), in which the step of determining further includes averaging, for each subset of the pixels making up one of the symbol values, the luminance values; and determining the symbol values based on the averaged luminance values.

(5) The method according to any one of features (1) to (4), in which the metadata includes a content identifier associated with the content.

(6) The method according to any one of features (1) to (5), in which the metadata includes a trigger that signals the circuitry of the reception apparatus to perform a predetermined process for an application that is executed in synchronization with the content.

(7) The method according to any one of features (1) to (6), in which the watermark is encoded within luminance values in at least line 1 of the video frame of the content.

(8) The method according to any one of features (1) to (7), in which the same watermark is encoded within luminance values in lines 1 and 2 of the video frame of the content.

(9) A non-transitory computer-readable storage medium storing a program, which when executed by a computer causes the computer to perform the method according to any one of features (1) to (8).

(10) A reception apparatus, including: circuitry configured to process content that includes metadata embedded therein, the metadata being embedded as a watermark in a first portion of a video frame of the content; and determine symbol values of the watermark embedded in the video frame based on luminance values in pixels of the first portion of the video frame of the content to extract the metadata, in which at least one of the luminance values is less than 16.

(11) The reception apparatus according to feature (10), in which the same watermark is embedded in a plurality of consecutive video frames of the content.

(12) The reception apparatus according to feature (10) or (11), in which the circuitry is further configured to detect a predetermined fixed pattern of symbol values based on luminance values in pixels of a second portion of the video frame of the content; and determine the symbol values when the predetermined fixed pattern is detected to extract the metadata.

(13) The reception apparatus according to any one of features (10) to (12), in which the circuitry is further configured to average, for each subset of the pixels making up one of the symbol values, the luminance values; and determine the symbol values based on the averaged luminance values.

(14) The reception apparatus according to any one of features (10) to (13), in which the metadata includes a content identifier associated with the content.

(15) The reception apparatus according to any one of features (10) to (14), in which the metadata includes a trigger that signals the circuitry to perform a predetermined process for an application that is executed in synchronization with the content.

(16) The reception apparatus according to any one of features (10) to (15), in which the watermark is encoded within luminance values in at least line 1 of the video frame of the content.

(17) The reception apparatus according to any one of features (10) to (15), in which the same watermark is encoded within luminance values in lines 1 and 2 of the video frame of the content.

(18) An information providing apparatus, including: circuitry configured to receive or retrieve content to be provided to a reception apparatus, embed metadata in a video frame of the content, the metadata being embedded as a watermark in a first portion of a video frame of the content, and provide the content to the reception apparatus, in which symbol values of the watermark are represented by luminance values in pixels of the first portion of the video frame of the content, and at least one of the luminance values is less than 16.

(19) The information providing apparatus according to feature (18), in which the same watermark is embedded in a plurality of consecutive video frames of the content.

(20) The information providing apparatus according to feature (18) or (19), in which the circuitry is further configured to embed a predetermined fixed pattern of symbol values using luminance values in pixels of a second portion of the video frame of the content, the predetermined fixed pattern being used by the reception apparatus to detect the presence of the watermark in the video frame.

(21) The information providing apparatus according to any one of features (18) to (20), in which each of the symbol values is represented by luminance values in a subset of the pixels making up the respective symbol value, and the reception apparatus determines the symbol values based on averages of the luminance values in the subset of the pixels.

(22) The information providing apparatus according to any one of features (18) to (21), in which the metadata includes a content identifier associated with the content.

(23) The information providing apparatus according to any one of features (18) to (22), in which the metadata includes a trigger that signals the circuitry of the reception apparatus to perform a predetermined process for an application to is executed in synchronization with the content.

(24) The information providing apparatus according to any one of features (18) to (23), in which the watermark is encoded within luminance values in at least line 1 of the video frame of the content.

(25) The information providing apparatus according to any one of features (18) to (24), in which the same watermark is encoded within luminance values in lines 1 and 2 of the video frame of the content.

The invention claimed is:

1. A method of a reception apparatus for extracting metadata, the method comprising:
   processing, by circuitry of the reception apparatus, content that includes the metadata embedded therein, the metadata being embedded as a watermark in a video frame of the content; and
   detecting, by the circuitry, symbol values of the watermark embedded in the video frame based on luminance values in pixels of the video frame of the content and based on predetermined luminance value thresholds, wherein
   at least one of the luminance values in the pixels of the video frame corresponding to symbol values of the watermark is less than 16, and
   the watermark is embedded in at least all of line 1 of the video frame.

2. The method according to claim 1, wherein the same watermark is embedded in a plurality of consecutive video frames of the content.

3. The method according to claim 1, further comprising:
   detecting a predetermined fixed pattern of symbol values based on luminance values in pixels of the video frame of the content, wherein the step of detecting detects the symbol values when the predetermined fixed pattern is detected to extract the metadata.

4. The method according to claim 1, wherein the step of determining further comprises:
   averaging, for each subset of the pixels making up one of the symbol values, the luminance values; and
   detecting the symbol values based on the averaged luminance values.

5. The method according to claim 1, wherein the metadata includes a content identifier associated with the content.

6. The method according to claim 1, wherein the metadata includes control information that signals the circuitry of the reception apparatus to perform a predetermined process for an application that is executed in synchronization with the content.

7. The method according to claim 1, wherein the same watermark is encoded entirely within luminance values of at least one of line 1 and line 2 of the video frame of the content and the watermark is not encoded in any other lines of the video frame.

8. A non-transitory computer-readable storage medium storing a program, which when executed by a computer causes the computer to perform a method of a reception apparatus for extracting metadata, the method comprising:
   processing content that includes the metadata embedded therein, the metadata being embedded as a watermark in a video frame of the content; and
   detecting, by the circuitry, symbol values of the watermark embedded in the video frame based on luminance values in pixels of the video frame of the content and based on predetermined luminance value thresholds, wherein
   symbol values of the watermark embedded in the video frame based on luminance values in pixels of the video frame of the content and based on a predetermined correspondence between the luminance values in the pixels of the video frame and symbol values of the watermark, wherein
   at least one of the luminance values in the pixels of the video frame corresponding to symbol values of the watermark is less than 16, and
   the watermark is embedded in at least all of line 1 of the video frame.

9. A reception apparatus, comprising:
   a memory; and
   a processing unit that, according to instructions loaded from the memory,
      processes content that includes metadata embedded therein, the metadata being embedded as a watermark in a video frame of the content; and
      detects symbol values of the watermark embedded in the video frame based on luminance values in pixels of the video frame of the content and based on predetermined luminance value thresholds, wherein
   at least one of the luminance values in the pixels of the video frame corresponding to symbol values of the watermark is less than 16, and
   the watermark is embedded in at least all of line 1 of the video frame.

10. The reception apparatus according to claim 9, wherein the same watermark is embedded in a plurality of consecutive video frames of the content.

11. The reception apparatus according to claim 9, wherein the processing unit:

detects a predetermined fixed pattern of symbol values based on luminance values in pixels of the video frame of the content; and detects the symbol values when the predetermined fixed pattern is detected to extract the metadata.

12. The reception apparatus according to claim 9, wherein the processing unit:

averages, for each subset of the pixels making up one of the symbol values, the luminance values; and detects the symbol values based on the averaged luminance values.

13. The reception apparatus according to claim 9, wherein the metadata includes a content identifier associated with the content.

14. The reception apparatus according to claim 9, wherein the metadata includes control information that signals the circuitry to perform a predetermined process for an application that is executed in synchronization with the content.

15. The reception apparatus according to claim 9, wherein the same watermark is entirely encoded within luminance values of at least line 1 and line 2 of the video frame of the content and the watermark is not encoded in any other lines of the video frame.

16. An information providing apparatus, comprising:

a memory; and a processing unit that, according to instructions loaded from the memory, receives or retrieves content to be provided to a reception apparatus, embeds metadata in a video frame of the content, the metadata being embedded as a watermark in a video frame of the content, and provides the content to the reception apparatus, wherein the metadata is extracted by the reception apparatus based on luminance values in pixels of the video frame of the content and based on predetermined luminance value thresholds, wherein at least one of the luminance values in the pixels of the video frame corresponding to symbol values of the watermark is less than 16, and the watermark is embedded in at least all of line 1 of the video frame.

17. The information providing apparatus according to claim 16, wherein the same watermark is embedded in a plurality of consecutive video frames of the content.

* * * * *